United States Patent
Tomaru et al.

(10) Patent No.: US 9,519,748 B2
(45) Date of Patent: Dec. 13, 2016

(54) ASSISTANCE DEVICE FOR STEERING DEVICE AND METHOD OF ASSISTING STEERING DEVICE DESIGN

(75) Inventors: Masaki Tomaru, Maebashi (JP); Naoki Sawada, Maebashi (JP); Akira Ichikawa, Fujisawa (JP); Ryou Oosawa, Maebashi (JP)

(73) Assignee: NSK LTD., Tokyo (JP)

( * ) Notice: Subject to any disclaimer, the term of this patent is extended or adjusted under 35 U.S.C. 154(b) by 907 days.

(21) Appl. No.: 13/812,084

(22) PCT Filed: Jun. 20, 2012

(86) PCT No.: PCT/JP2012/065730
§ 371 (c)(1),
(2), (4) Date: Jan. 24, 2013

(87) PCT Pub. No.: WO2013/031347
PCT Pub. Date: Mar. 7, 2013

(65) Prior Publication Data
US 2014/0195204 A1    Jul. 10, 2014

(30) Foreign Application Priority Data

Aug. 29, 2011 (JP) ................................. 2011-186469

(51) Int. Cl.
*G06F 17/50* (2006.01)
*B62D 1/19* (2006.01)
(Continued)

(52) U.S. Cl.
CPC ............. *G06F 17/5086* (2013.01); *B62D 1/16* (2013.01); *B62D 1/20* (2013.01); *G06F 17/5095* (2013.01); *B62D 1/192* (2013.01); *G06F 2217/02* (2013.01)

(58) Field of Classification Search
CPC ............. G06F 17/5086; G06F 17/5095; G06F 2217/02; B62D 1/16; B62D 1/192; B62D 1/20
See application file for complete search history.

(56) References Cited

U.S. PATENT DOCUMENTS 5,560,650 A * 10/1996 Woycik ................. B62D 1/192
280/777
7,559,266 B2 * 7/2009 Kurokawa ............. B62D 1/192
180/89.12
(Continued)

FOREIGN PATENT DOCUMENTS

EP         1593581 A1    11/2005
JP         07-105244 A    4/1995
(Continued)

OTHER PUBLICATIONS

Ueda, H. "Technical Trends Regarding Intermediate Shaft in Steering Systems" Koyo Engineering J. English Edition No. 168E (2005).*

(Continued)

*Primary Examiner* — Kamini S Shah
*Assistant Examiner* — Jay B Hann
(74) *Attorney, Agent, or Firm* — Sughrue Mion, PLLC

(57) ABSTRACT

A design assistance device for a steering device and a method of assisting a steering device design which assists a design of a steering device including an intermediate shaft by using existing components of a tube yoke and a shaft yoke. A design assistance device 1 for a steering device displays a select button on a display device when a fitting length of the combination of a candidate component of the tube yoke and a candidate component of the shaft yoke satisfies a condition of a fitting length. When the select
(Continued)

button is selected, a control device 4 may receive information in which a drawing selected by a designer is determined.

18 Claims, 35 Drawing Sheets

(51) Int. Cl.
*B62D 1/20* (2006.01)
*B62D 1/16* (2006.01)

(56) References Cited

U.S. PATENT DOCUMENTS

| 7,591,354 B2* | 9/2009 | Yoshioka | B62D 1/192 |
| | | | 280/777 |
| 8,965,743 B2* | 2/2015 | Tomaru | B62D 1/20 |
| | | | 703/8 |
| 2005/0284245 A1 | 12/2005 | Chen et al. | |
| 2008/0103734 A1* | 5/2008 | Kobayashi | G06F 17/5086 |
| | | | 703/1 |
| 2009/0001701 A1* | 1/2009 | Watanabe | B62D 1/20 |
| | | | 280/777 |
| 2012/0185219 A1 | 7/2012 | Tomaru et al. | |

FOREIGN PATENT DOCUMENTS

| JP | 07-200659 A | 8/1995 |
| JP | 11238069 A | 8/1999 |
| JP | 2003170839 A | 6/2003 |
| JP | 2004-175249 A | 6/2004 |
| JP | 2006-36080 A | 2/2006 |
| JP | 2008-197899 A | 8/2008 |
| JP | 2008-208865 A | 9/2008 |
| JP | 2008-269080 A | 11/2008 |
| JP | 2009-301410 A | 12/2009 |
| JP | 2010-181937 A | 8/2010 |
| JP | 201 1-21 6024 A | 10/2011 |
| WO | 2012/046492 A1 | 4/2012 |

OTHER PUBLICATIONS

Yi Zhang, et al. "New reasoning algorithm for assembly tolerance specifications and corresponding tolerance zone types" Computer-Aided Design, vol. 43, pp. 1606-1628 (Jul. 3, 2011) available at <http://www.sciencedirect.com/science/article/pii/S0010448511001503>.*
Communication dated Jun. 10, 2015 from the European Patent Office in counterpart application No. 12813248.7.
Communication dated Mar. 29, 2016, from the Japanese Patent Office in counterpart application No. 2015-108390.

* cited by examiner

FIG.6

MAIN SPECIFICATION — 601

- EXTENSION-CONTRACTION TYPE — 611
  - ⦿ A
  - ○ B
  - ○ C

- TUBE ARRANGEMENT — 621
  - ⦿ TUBE TO BE DISPOSED NEAR COLUMN
  - ○ TUBE TO BE DISPOSED NEAR PINION

- PHASE ANGLE: [**.*] deg — 631

- JOINT LENGTH (DISTANCE BETWEEN HJ-GJ): [***] mm — 641

- COLLISION CONTRACTION LENGTH: [**.*] mm OR MORE — 651

| JOINT LENGTH (mm) \ FITTING LENGTH (mm) | EXTENSION-CONTRACTION TYPE | | |
|---|---|---|---|
| | A TYPE | B TYPE | C TYPE |
| W | Wa | Wb | Wc |
| W+10 | (W+10)a | (W+10)b | (W+10)c |
| W+20 | (W+20)a | (W+20)b | (W+20)c |
| W+30 | (W+30)a | (W+30)b | (W+30)c |
| ⋮ | ⋮ | ⋮ | ⋮ |

FIG.8-1

EXISTING COMPONENT DATA OF TUBE YOKE (320)

| DRAWING NUMBER | EXTENSION-CONTRACTION SPECIFICATION | TUBE YOKE LENGTH Tw |
|---|---|---|
| TX1 | B | TXw1 |
| TX2 | C | TXw2 |
| TX3 | B | TXw3 |
| TY4 | A | TYw4 |
| ⋮ | ⋮ | ⋮ |
| ⋮ | ⋮ | ⋮ |

FIG.8-2

EXISTING COMPONENT DATA OF SHAFT YOKE (330)

| DRAWING NUMBER | EXTENSION-CONTRACTION SPECIFICATION | SHAFT YOKE LENGTH Sw |
|---|---|---|
| SX1 | B | SXw1 |
| SY2 | A | SYw2 |
| SZ3 | C | SZw3 |
| ⋮ | ⋮ | ⋮ |
| SZ10 | C | SZw10 |

FIG.8-3

EXTRACTION DATA OF TUBE YOKE CANDIDATE COMPONENT

| DRAWING NUMBER | EXTENSION-CONTRACTION SPECIFICATION | TUBE YOKE LENGTH Tw |
|---|---|---|
| TY1 | A | TYw1 |
| TY2 | A | TYw2 |
| TY3 | A | TYw3 |
| TY4 | A | TYw4 |
| ⋮ | ⋮ | ⋮ |
| ⋮ | ⋮ | ⋮ |

FIG.8-4

EXTRACTION DATA OF SHAFT YOKE CANDIDATE COMPONENT

| DRAWING NUMBER | EXTENSION-CONTRACTION SPECIFICATION | SHAFT YOKE LENGTH Sw |
|---|---|---|
| SY1 | A | SYw1 |
| SY2 | A | SYw2 |
| SY3 | A | SYw3 |
| ⋮ | ⋮ | ⋮ |
| SY7 | A | SYw7 |

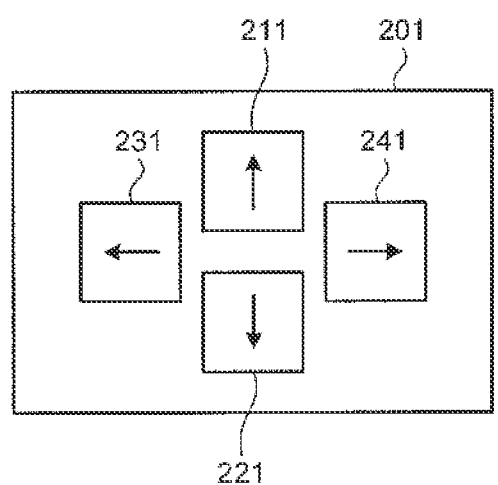

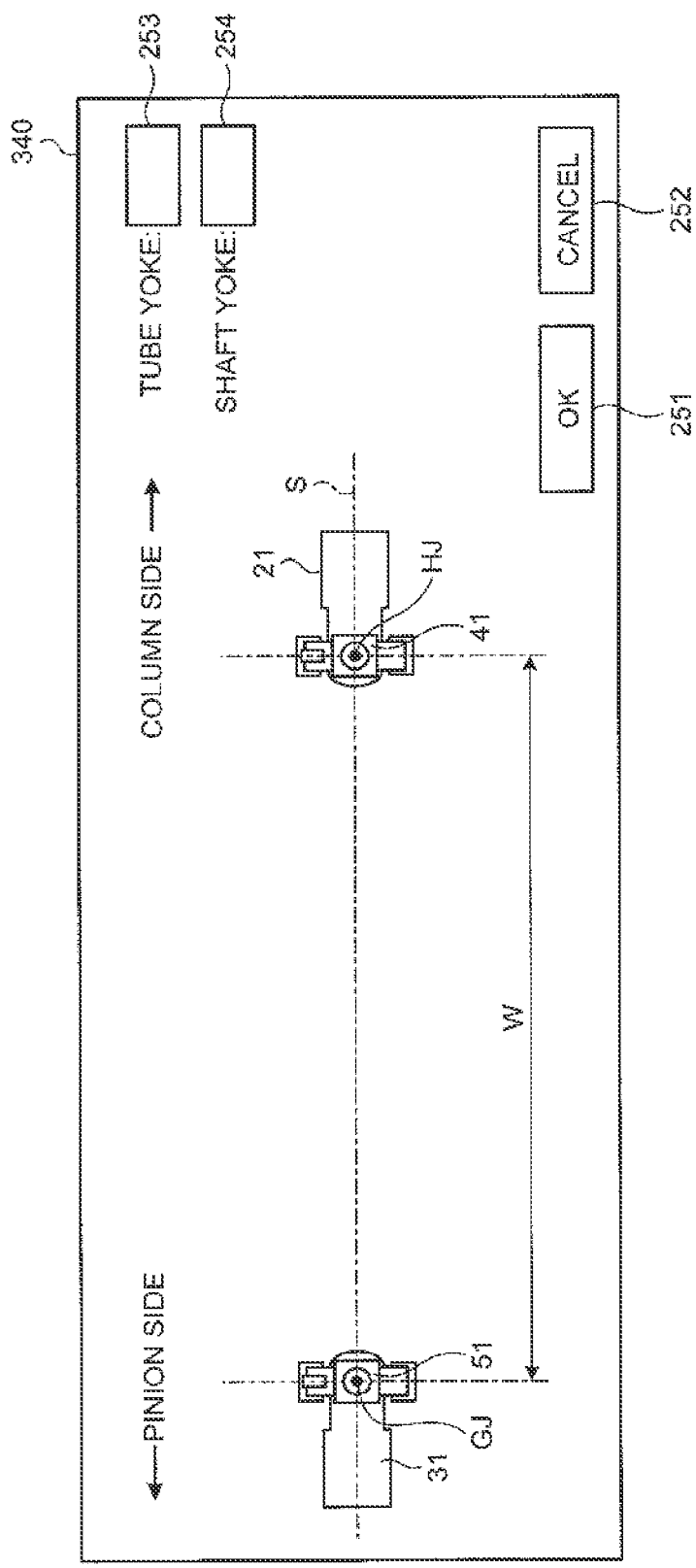

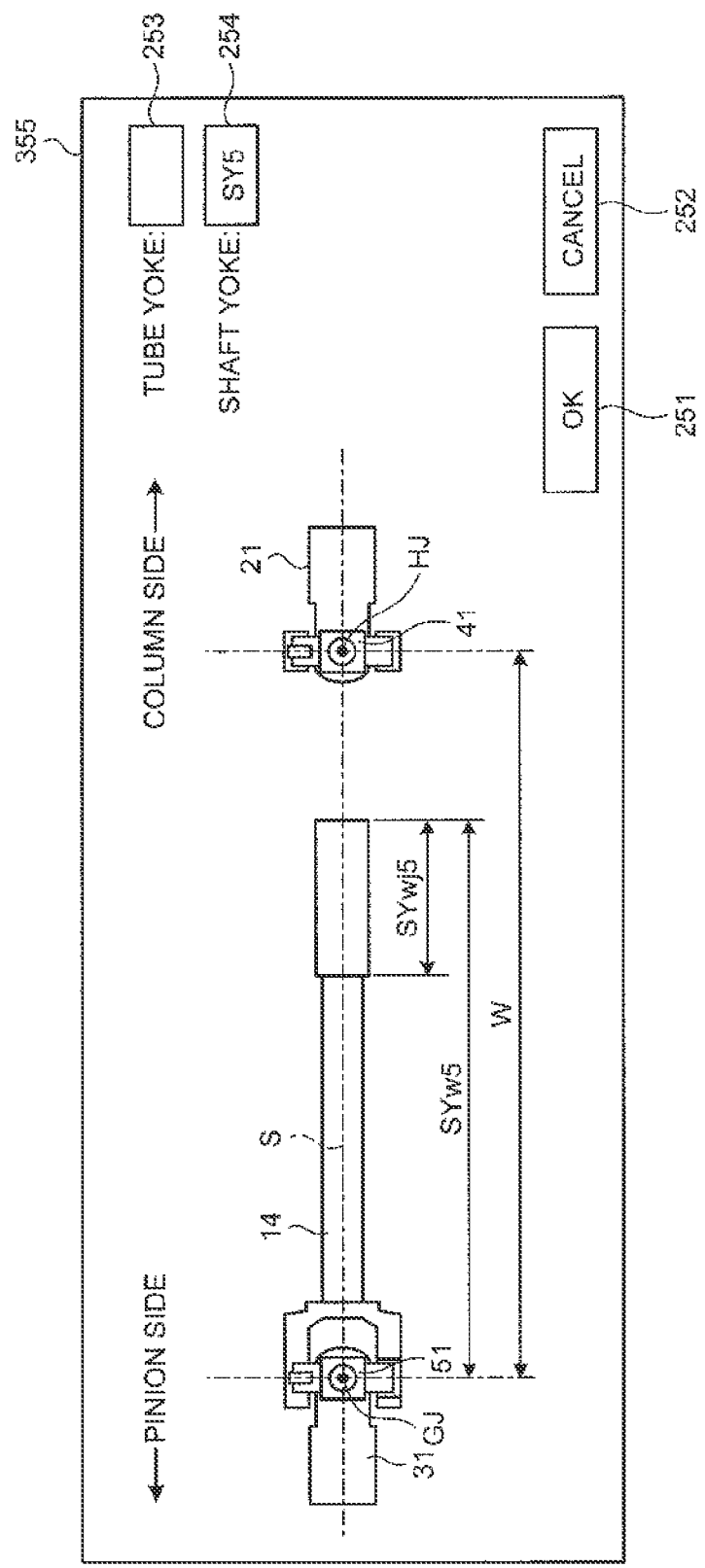

FIG.16

| | TY1 | TY2 | TY3 | TY4 |
|---|---|---|---|---|
| SY1 | | | | × |
| SY2 | | | | ○ |
| SY3 | | | | ○ |
| SY4 | | | | ○ |
| SY5 | | | | ○ |
| SY6 | | | | × |
| SY7 | | | | × |
| | | | | |

| | TY1 | TY2 | TY3 | TY4 |
|---|---|---|---|---|
| COST | × | × | △ | ○ |

| | COST |
|---|---|
| SY1 | ○ |
| SY2 | × |
| SY3 | △ |
| SY4 | ○ |
| SY5 | × |
| SY6 | × |
| SY7 | × |

|  |  | TY2 | TY3 | TY4 |
|---|---|---|---|---|
| SY1 | - | - | - | × |
| SY2 | - | - | 5 | 4 |
| SY3 | - | - | 3 | 2 |
| SY4 | - | 4 | 2 | 1 |
| SY5 | - | - | 5 | 4 |
| SY6 | - | - | - | - |
| SY7 | - | - | - | - |

441

ASSISTANCE DEVICE FOR STEERING DEVICE AND METHOD OF ASSISTING STEERING DEVICE DESIGN

CROSS REFERENCE TO RELATED APPLICATIONS

This application is a National Stage of International Application No. PCT/JP2012/065730 filed Jun. 20, 2012, claiming priority based on Japanese Patent Application No. 2011-186469 filed Aug. 29, 2011, the contents of all of which are incorporated herein by reference in their entirety.

TECHNICAL FIELD

The present invention relates to a design assistance device for a steering device which assists a design of a steering device of a vehicle and a method of assisting a steering device design.

BACKGROUND ART

A steering device transmits a motion of a steering shaft, rotating by the operation of a handle, to a pinion shaft as an input shaft of a steering gear. The direction of a vehicle wheel is changed by the transmitted motion of the steering gear. In general, the rotation axis of the steering shaft and the axis of the pinion shaft are not provided on the same straight line. Therefore, an intermediate shaft is provided between the steering shaft and the steering gear with a universal joint therebetween, and the end of the intermediate shaft is coupled to the steering shaft. Further, the end of the intermediate shaft is coupled to the end of the pinion shaft through the universal joint. Due to the presence of two components, the universal joint and the intermediate shaft, power is transmitted between the steering shaft and the input shaft of the steering gear which are not present on the same straight line.

The intermediate shaft is disposed in a three-dimensional space between the steering shaft and the pinion shaft. In order to rotate the steering shaft and the pinion shaft at the same angular velocity, the intermediate shaft module needs to be disposed so that the angle formed between the rotation axis of the steering shaft and the rotation axis of the intermediate shaft is equal to the angle formed between the axis of the steering gear and the rotation axis of the intermediate shaft. Further, in recent years, the steering device which operates the vehicle wheel of the vehicle is designed by a simulation technique. For example, there are techniques disclosed in Patent Literature 1 to Patent Literature 3.

CITATION LIST

Patent Literature

Patent Literature 1: Japanese Patent Application Laid-Open No. 2004-175249
Patent Literature 2: Japanese Patent Application Laid-Open No. 2008-197899
Patent Literature 3: Japanese Patent Application Laid-Open No. 2008-269080

SUMMARY OF INVENTION

Technical Problem

On the other hand, the intermediate shaft needs to be made in consideration of the conditions of the joint length between the steering shaft and the pinion shaft and the fitting length of the connection of the tube yoke and the shaft yoke constituting the intermediate shaft, and hence it takes effort in design for each of different conditions.

The invention is made in view of the above-described circumstances, and it is an object of the invention to provide a design assistance device for a steering device and a method of assisting a steering device design which assists a design of a steering device including an intermediate shaft by using existing components of a tube yoke and a shaft yoke.

Solution to Problem

In order to solve the above described problem and achieve the object, according to the present invention, a design assistance device for a steering device, the design assistance device assisting a design of an intermediate shaft module including a tube yoke and a shaft yoke connected to the tube yoke, the design assistance device for the steering device includes: a storage unit which stores at least information having a joint length as a distance between a first connection reference point where the intermediate shaft module is connected to a column yoke and a second connection reference point where the intermediate shaft module is connected to a pinion side yoke and a fitting length specification as a condition of a fitting length where the tube yoke and the shaft yoke are connected to each other, information of an existing component of an already designed tube yoke, and information of an existing component of an already designed shaft yoke; a candidate component extraction unit which extracts a candidate component of the tube yoke included in the joint length from the information of the existing component of the tube yoke and extracts a candidate component of the shaft yoke included in the joint length from the information of the existing component of the tube yoke; a calculation unit which is disposed between the first connection reference point and the second connection reference point and calculates an instruction for storing a combination of the candidate component of the tube yoke and the candidate component of the shaft yoke in the storage unit when the fitting length where the candidate component of the tube yoke and the candidate component of the shaft yoke are combined with each other satisfies the fitting length specification; and a display unit which displays an index indicating the presence of the instruction calculated by the calculation unit.

With such a configuration, it is possible to assist the selection of the combination of the candidate component of the tube yoke and the candidate component of the shaft yoke by using the existing components of the tube yoke and the shaft yoke as much as possible. The designer may select the combination of the candidate component of the tube yoke and the candidate component of the shaft yoke appropriate for the conditions of the joint length and the fitting length from the existing components of which the number of the tube yokes and the shaft yokes is large.

As a preferable aspect of the present invention, the display unit does not display the index when the fitting length where the candidate component of the tube yoke and the candidate component of the shaft yoke are combined with each other does not satisfy the fitting length specification.

With such a configuration, it is possible to prevent the designer from selecting the combination of the candidate component of the tube yoke and the candidate component of the shaft yoke which is not appropriate for the conditions of the joint length and the fitting length.

As a preferable aspect of the present invention, the storage unit stores a collision-contraction length specification as a condition of a collision-contraction length that is a distance in which the fitting between the tube yoke and the shaft yoke is released and the shaft yoke is movable inside the tube yoke, and the display unit does not display the index when the collision-contraction length where the candidate component of the tube yoke and the candidate component of the shaft yoke are combined with each other does not satisfy the collision-contraction length specification.

With such a configuration, it is possible to prevent the designer from selecting the combination of the candidate component of the tube yoke and the candidate component of the shaft yoke which is not appropriate for the condition of the collision contraction length.

As a preferable aspect of the present invention, the display unit displays a drawing of the candidate component of the tube yoke or the candidate component of the shaft yoke between the first connection reference point and the second connection reference point in synchronization with selection information of an input unit that selects the candidate component of the tube yoke or the candidate component of the shaft yoke extracted by the candidate component extraction unit.

With such a configuration, it is possible to assist the designer to check the combination of the candidate component of the tube yoke and the candidate component of the shaft yoke.

As a preferable aspect of the present invention, the display unit receives the index and displays information of a combination of the candidate component of the tube yoke and the candidate component of the shaft yoke stored in the storage unit in a three-dimensional space in which the longitudinal direction, the vertical direction, and the transverse direction of a vehicle equipped with the steering device are defined.

With such a configuration, it is possible to assist the designer to three-dimensionally check the combination of the candidate components of the tube yoke and the shaft yoke.

As a preferable aspect of the present invention, the calculation unit gives a rank of selecting a combination of candidate components in accordance with priority rank information stored in the storage unit to a combination of plural candidate components of the tube yoke and the shaft yoke stored based on the instruction.

With such a configuration, when there are plural combinations of the candidate component of the tube yoke and the candidate component of the shaft yoke, it is possible to assist the selection of the combination in which a condition such as cost is better in the combinations of the candidate components.

In order to solve the above described problem and achieve the object, according to the present invention, a method of assisting a steering device design, which causes a computer to assist a design of an intermediate shaft module including a tube yoke and a shaft yoke connected to the tube yoke, the method of assisting the steering device design includes: a joint length information acquiring of acquiring information of a joint length as a distance between a first connection reference point where the intermediate shaft module is connected to a column yoke and a second connection reference point where the intermediate shaft module is connected to a pinion side yoke; a fitting length information acquiring of acquiring information of a fitting length specification as a condition of a fitting length where the tube yoke and the shaft yoke are connected to each other; a candidate component extracting of acquiring information of an existing component of an already designed tube yoke and information of an existing component of an already designed shaft yoke, extracting a candidate component of the tube yoke included in the joint length acquired in the joint length information acquiring from the information of the existing component of the tube yoke, and extracting a candidate component of the shaft yoke included in the joint length acquired in the joint length information acquiring from the information of the existing component of the tube yoke; and calculating an instruction for storing a combination of the candidate component of the tube yoke and the candidate component of the shaft yoke when the fitting length of the combination of the candidate component of the tube yoke and the candidate component of the shaft yoke extracted from the candidate component extracting satisfies the fitting length specification acquired in the fitting length information acquiring.

By such a method, it is possible to assist the selection of the combination of the candidate component of the tube yoke and the candidate component of the shaft yoke by using the existing components of the tube yoke and the shaft yoke as much as possible. The designer may select the combination of the candidate component of the tube yoke and the candidate component of the shaft yoke appropriate for the conditions of the joint length and the fitting length from the existing components of which the number of the tube yokes and the shaft yokes is large.

As a preferable aspect of the present invention, in the calculating, when a collision-contraction length as a distance in which the fitting between the tube yoke and the shaft yoke is released and the shaft yoke is movable inside the tube yoke does not satisfy a collision-contraction length specification as a restriction condition of a vehicle, the instruction for storing the combination of the candidate component of the tube yoke and the candidate component of the shaft yoke is not calculated.

By such a method, it is possible to prevent the designer from selecting the combination of the candidate component of the tube yoke and the candidate component of the shaft yoke which is not appropriate for the condition of the collision contraction length.

As a preferable aspect of the present invention, the method of assisting the steering device design further includes: a priority candidate component determining of determining a combination of prioritized candidate components with respect to the combinations of plural candidate components of the tube yoke and the shaft yoke stored based on the instruction.

By such a method, when there are plural combinations of the candidate component of the tube yoke and the candidate component of the shaft yoke, it is possible to assist the selection of the combination in which a condition such as cost is better in the combinations of the candidate components.

As a preferable aspect of the present invention, the method of assisting the steering device design further includes: displaying information of the combination of the candidate component of the tube yoke and the candidate component of the shaft yoke stored based on the instruction in a three-dimensional space in which the longitudinal direction, the vertical direction, and the transverse direction of a vehicle equipped with the steering device are defined.

By such a method, it is possible to assist the designer to three-dimensionally check the combination of the candidate components of the tube yoke and the shaft yoke.

Advantageous Effects of Invention

According to the invention, it is possible to provide a design assistance device for a steering device that assists a design of a steering device having an intermediate shaft by using existing components of a tube yoke and a shaft yoke and to provide a method of assisting a steering device design.

BRIEF DESCRIPTION OF DRAWINGS

FIG. 6 is a diagram illustrating an example of a design information input screen.

FIG. 7 is a diagram illustrating an example of a relation between a joint length and a fitting length.

FIG. 8-1 is a diagram illustrating an example of information of an existing component of the tube yoke.

FIG. 8-2 is a diagram illustrating an example of information of an existing component of the shaft yoke.

FIG. 8-3 is a diagram illustrating an example of a candidate component of the tube yoke.

FIG. 8-4 is a diagram illustrating an example of a candidate component of the shaft yoke.

FIG. 9 is a diagram illustrating an example of an input unit.

FIG. 10 is a diagram illustrating an example of an initial screen of an output display screen.

FIG. 11-1 is a diagram illustrating the output display screen which displays an example of the candidate component of the tube yoke.

FIG. 11-2 is a diagram illustrating the output display screen which displays an example of the candidate component of the tube yoke.

FIG. 11-3 is a diagram illustrating the output display screen which displays an example of the candidate component of the tube yoke.

FIG. 11-4 is a diagram illustrating the output display screen which displays an example of the candidate component of the tube yoke.

FIG. 12-1 is a diagram illustrating the output display screen which displays an example of the candidate component of the shaft yoke.

FIG. 12-2 is a diagram illustrating the output display screen which displays an example of the candidate component of the shaft yoke.

FIG. 12-3 is a diagram illustrating the output display screen which displays an example of the candidate component of the shaft yoke.

FIG. 12-4 is a diagram illustrating the output display screen which displays an example of the candidate component of the shaft yoke.

FIG. 12-5 is a diagram illustrating the output display screen which displays an example of the candidate component of the shaft yoke.

FIG. 12-6 is a diagram illustrating the output display screen which displays an example of the candidate component of the shaft yoke.

FIG. 12-7 is a diagram illustrating the output display screen which displays an example of the candidate component of the shaft yoke.

FIG. 13-1 is a diagram illustrating the output display screen which displays an example of the combination of the candidate components of the tube yoke and the shaft yoke.

FIG. 13-2 is a diagram illustrating the output display screen which displays an example of the combination of the candidate components of the tube yoke and the shaft yoke.

FIG. 13-3 is a diagram illustrating the output display screen which displays an example of the combination of the candidate components of the tube yoke and the shaft yoke.

FIG. 13-4 is a diagram illustrating the output display screen which displays an example of the combination of the candidate components of the tube yoke and the shaft yoke.

FIG. 13-5 is a diagram illustrating the output display screen which displays an example of the combination of the candidate components of the tube yoke and the shaft yoke.

FIG. 13-6 is a diagram illustrating the output display screen which displays an example of the combination of the candidate components of the tube yoke and the shaft yoke.

FIG. 13-7 is a diagram illustrating the output display screen which displays an example of the combination of the candidate components of the tube yoke and the shaft yoke.

FIG. 16 is a diagram illustrating an example of a data table of a combination of the candidate components of the tube yoke and the shaft yoke.

FIG. 17-1 is a diagram illustrating an example of a cost data table of the candidate component of the tube yoke.

FIG. 17-2 is a diagram illustrating an example of a cost data table of the candidate component of the shaft yoke.

FIG. 18 is a diagram illustrating an example of a rank data table illustrating a priority rank of the combination of the candidate components of the tube yoke and the shaft yoke.

DESCRIPTION OF EMBODIMENTS

Figure 1:
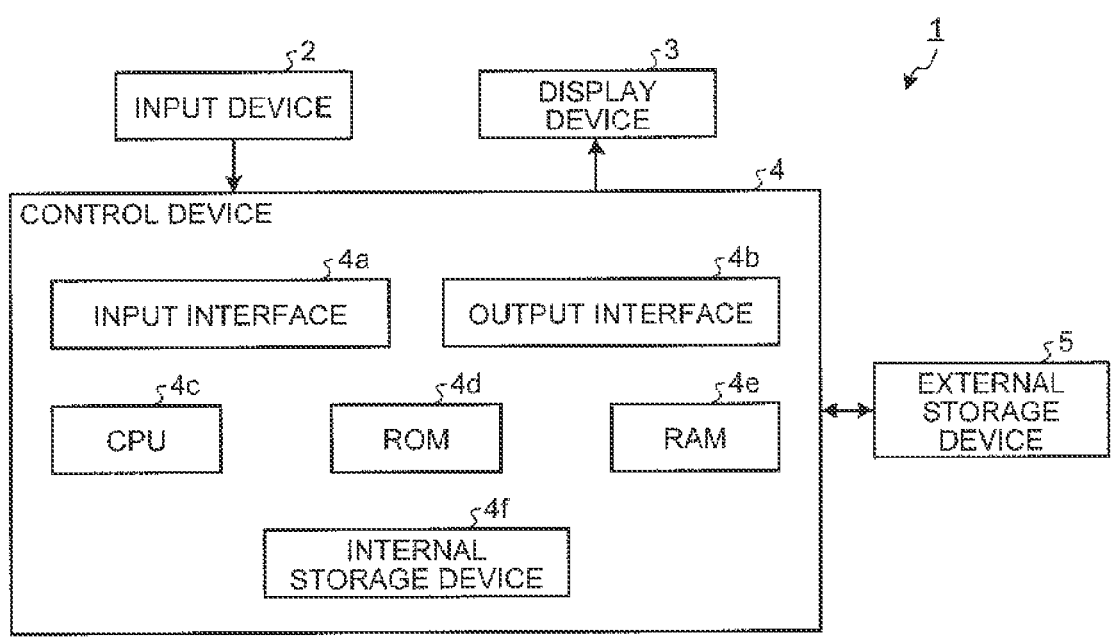
FIG. 1 is a diagram illustrating a configuration of a design assistance device for a steering device of an embodiment.

A mode for carrying out the invention (embodiment) will be described in detail by referring to the drawings. The invention is not limited to the contents described in the embodiments below. Further, the constituents to be described later include a constituent that may be easily supposed by the person skilled in the art and the substantially same constituent. Further, the embodiments to be described later may be appropriately combined with each other. Further, the device, the system, the method, and the modified example may be arbitrarily combined with each other within the scope which may be apparently understood by the person skilled in the art.

(First Embodiment)

FIG. 1 is a diagram illustrating a configuration of a design assistance device for a steering device of an embodiment. As illustrated in FIG. 1, a design assistance device 1 for a steering device includes an input device 2, a display device 3, a control device 4, and an external storage device 5.

The input device 2 is a mouse, a keyboard, or the like, and receives an input operation and a selection operation of a designer as a user and outputs an input signal to the control device 4. The display device 3 is a device such as a cathode ray tube (CRT) and a liquid crystal display on which an image is displayed.

The control device 4 is a computer such as a personal computer (PC), and includes an input interface 4a, an output interface 4b, a central processing unit (CPU) 4c, a read only memory (ROM) 4d, a random access memory (RAM) 4e, and an internal storage device 4f. The input interface 4a, the output interface 4b, the CPU 4c, the ROM 4d, the RAM 4e, and the internal storage device 4f are connected to each other via an internal bus.

The input interface 4a receives an input signal from the input device 2 and outputs the signal to the CPU 4c. The output interface 4b receives an image signal from the CPU 4c and outputs the signal to the display device 3.

The ROM 4d stores a program such as a basic input output system (BIOS). The internal storage device 4f is, for example, a hard disk drive (HDD) or flash memory, and stores an operating system program or an application program. The CPU 4c is a calculation unit, and realizes various functions by executing a program stored in the ROM 4d or the internal storage device 4f while using the RAM 4e as a work area.

The external storage device 5 is a HDD or a server. In a case where the external storage device 5 is a server, the external storage device 5 is connected to the control device 4 via a network such as a LAN. Further, the external storage device 5 may be disposed at a position away from the control device 4.

The internal storage device 4f or the external storage device 5 stores an existing component database storing information of a component which constitutes a steering and has a production record. In this way, the internal storage device 4f or the external storage device 5 becomes a storage unit.

Figure 2:
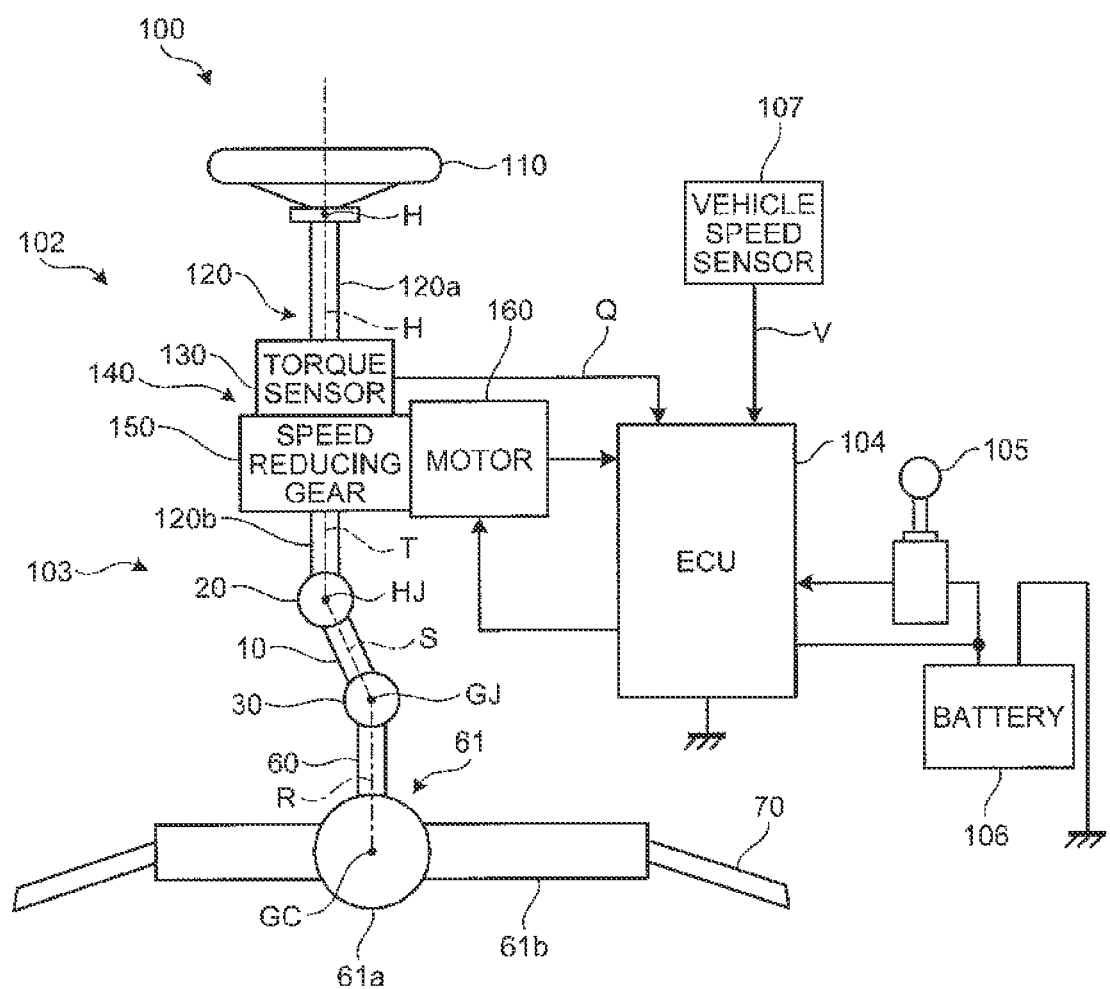
FIG. 2 is a diagram illustrating a schematic configuration of a steering device which is mounted on a vehicle.

FIG. 2 is a schematic diagram illustrating a schematic configuration of a steering device which is mounted on a vehicle. A vehicle 100 includes a steering device 102, a steering mechanism 103 of the steering device 102, a control unit 104, an ignition switch 105, a battery 106, and a vehicle speed sensor 107. Further, the vehicle 100 includes various general constituents of a vehicle, such as an engine and a vehicle wheel other than the constituents illustrated in FIG. 2. The steering device 102 illustrated in FIG. 2 is an electric power steering device.

The steering device 102 includes a handle (a steering wheel) 110 which is operated by a driver, a steering shaft 120 which transmits a rotation input from the handle 110, a torque sensor 130 which detects a torque input to the steering shaft 120 and a rotation angle of the steering shaft 120, and an assist steering mechanism 140 which assists the rotation of the steering shaft 120 based on the torque detected by the torque sensor 130.

The steering device 102 detects a steering torque, which is generated in the steering shaft 120 with the operation of the handle 110, by the torque sensor 130. Further, the steering device 102 controls the driving of an electric motor 160 using the control unit 104 based on the detected signal and generates an assist steering torque so as to assist the steering force of the handle 110.

The steering shaft 120 which is connected to the handle 110 includes an input shaft 120a to which the driver's steering force is applied and a column output shaft 120b, and the torque sensor 130 and a speed reducing gear box 150 are interposed between the input shaft 120a and the column output shaft 120b. The steering force which is transmitted to the column output shaft 120b of the steering shaft 120 is transmitted to the steering mechanism 103.

The torque sensor 130 detects the steering force which is transmitted to the input shaft 120a through the handle 110 as a steering torque.

The assist steering mechanism 140 is connected to the column output shaft 120b of the steering shaft 120, and transmits the assist steering torque to the column output shaft 120b. The assist steering mechanism 140 includes the speed reducing gear box 150 which is connected to the column output shaft 120b and the electric motor 160 which is connected to the speed reducing gear box 150 and generates the assist steering torque.

Further, the column is constituted by the steering shaft 120, the torque sensor 130, and the speed reducing gear box 150, and the electric motor 160 gives the assist steering torque to the column output shaft 120b of the column. That is, the electric power steering device of the embodiment is of a column assisting type.

The steering mechanism 103 of the steering device 102 includes a universal joint 20, an intermediate shaft module 10, a universal joint 30, a pinion shaft 60, a steering gear 61, and a tie-rod 70. The steering force which is transmitted from the steering device 102 to the steering mechanism 103 is transmitted to the pinion shaft 60 through the universal joint 20, the intermediate shaft module 10, and the universal joint 30. The steering force which is transmitted to the pinion shaft 60 is transmitted to the tie-rod 70 through the steering gear 61, and turns a turning wheel (not illustrated).

The steering gear 61 is configured as a rack-and-pinion type having a pinion 61a connected to the pinion shaft 60 and a rack 61b meshing with the pinion 61a, and converts a rotation motion transmitted to the pinion 61a into a linear motion by the rack 61b.

The control unit (ECU, Electronic Control Unit) 104 controls the driving of the vehicle 100, such as the electric motor 160, the engine, and the like. Electric power is supplied from the battery 106 to the control unit 104 when the ignition switch 105 is turned on. The control unit 104 calculates an assist steering instruction value of an assist instruction based on a steering torque Q detected by the torque sensor 130 and a running speed V detected by the vehicle speed sensor 107, and controls a supply current value to the electric motor 160 based on the calculated assist steering instruction value.

The steering device 102 of the embodiment is provided with a tilt mechanism and a telescopic mechanism. In the steering device 102, the position of tilting the handle 110 and the position of the handle 110 in the longitudinal direction of the vehicle are adjustable. When the position of the handle is changed by the action of the tilt mechanism and the telescopic mechanism, a handle position reference point H moves. The handle position reference point H is positioned on the axis T of the rotation center of the steering shaft 120.

A connection reference point HJ of the universal joint 20 where the column output shaft 120b of the steering shaft 120 is connected to the intermediate shaft module 10 is positioned on the axis T of the rotation center of the steering shaft 120. The connection reference point HJ of the universal joint 20 is connected to the intermediate shaft module 10 and the universal joint 20. The connection reference point HJ of the universal joint 20 is positioned on the reference axis S of the rotation center of the intermediate shaft module 10.

A connection reference point GJ of the universal joint 30 where the intermediate shaft module 10 is connected to the pinion shaft 60 is positioned on the reference axis S of the rotation center of the intermediate shaft module 10. The connection reference point GJ of the universal joint 30 is positioned on the axis R of the rotation center of the pinion shaft 60. A steering gear reference point GC which is the intersection point between the pinion shaft 60 and the steering gear 61 is also positioned on the axis R of the rotation center of the pinion shaft 60.

Figure 3:
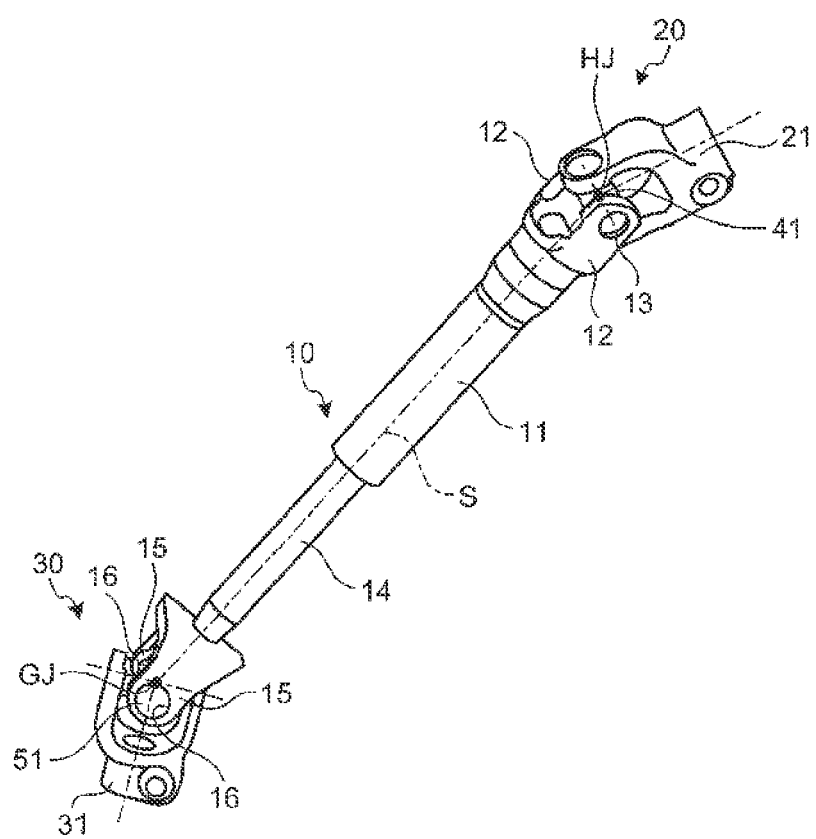
FIG. 3 is a diagram illustrating an example of an intermediate shaft module.
Figure 4:
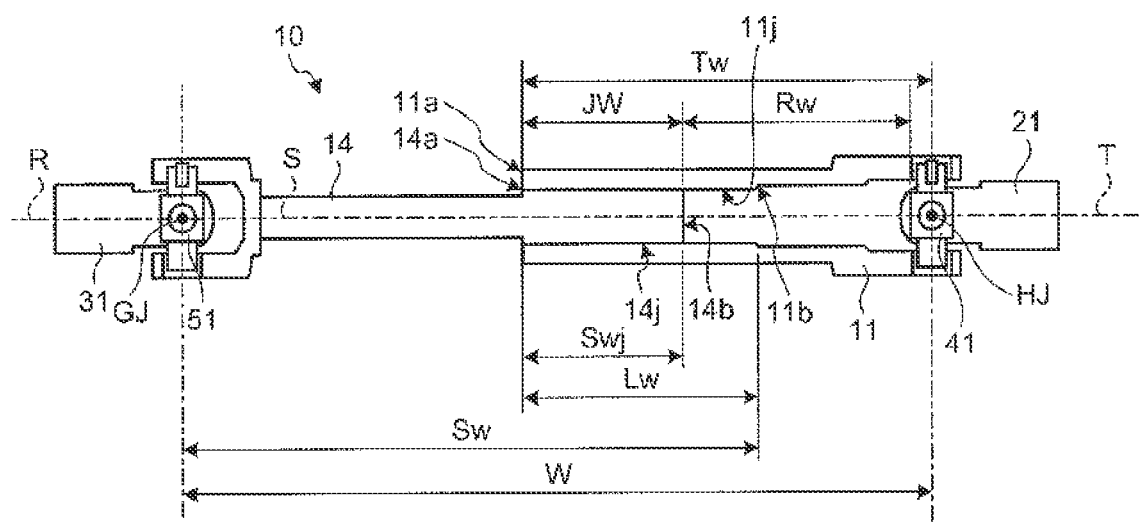
FIG. 4 is a diagram illustrating an example of a tube yoke and an example of a shaft yoke.

Next, the intermediate shaft module will be described by referring to FIGS. 3 and 4. FIG. 3 is a diagram illustrating an example of the intermediate shaft module. FIG. 4 is a diagram illustrating an example of the tube yoke and an example of the shaft yoke.

As illustrated in FIG. 3, the intermediate shaft module 10 is disposed between a column yoke 21 connected to the column output shaft 120b of the steering shaft 120 and a pinion side yoke 31 connected to the pinion shaft 60. The intermediate shaft module 10 includes a tube yoke 11 and a shaft yoke 14.

One end of the tube yoke 11 is formed in a U-shape, and is provided with a pair of arm portions 12 and 12 facing each other. The arm portions 12 and 12 are provided with a pair of bearing holes 13 and 13 each of which faces each of the arm portions 12 and 12. The pivot axis which connects the hole centers of the bearing holes 13 and 13 is perpendicular to the axis as the rotation axis of the tube yoke 11. The intersection point between the pivot axis and the axis is the connection reference point HJ. A cross joint 41 is interposed between the pair of arm portions 12 and 12. Therefore, one end of the tube yoke 11 is connected to the column yoke 21 through the cross joint 41. Further, the other end of the tube yoke 11 is connectable to the shaft yoke 14.

Further, one end of the shaft yoke 14 is formed in a U-shape, and is provided with a pair of arm portions 15 and 15 facing each other. The arm portions 15 and 15 are provided with a pair of bearing holes 16 and 16 each of which faces each of the arm portions 15 and 15. The pivot axis which connects the hole centers of the bearing holes 16 and 16 is perpendicular to the axis as the rotation center of the tube yoke 11. The intersection point between the pivot axis and the axis is the connection reference point GJ. A cross joint 51 is interposed between the pair of arm portions 15 and 15. Therefore, one end of the shaft yoke 14 is connected to the pinion side yoke 31 through the cross joint 51. Further, the other end of the shaft yoke 14 is connectable to the tube yoke 11.

As illustrated in FIG. 4, the ends of the tube yoke 11 and the shaft yoke 14 are fitted to each other. The tube yoke 11 and the shaft yoke 14 are fitted to each other so that the axis as the rotation center of the tube yoke 11 and the axis as the rotation center of the shaft yoke 14 are aligned to the axis S. That is, the axis S illustrated in FIGS. 3 and 4 is a rotation axis as the rotation center of the intermediate shaft module 10.

Further, the tube yoke 11 includes a tube yoke fitting portion 11j which is fittable to the shaft yoke 14 at the inner peripheral side of the cylinder of the tube yoke 11, a tube yoke fitting leading end portion 11a which is a leading point of the tube yoke fitting portion 11j, and a tube yoke fitting tail end portion 11b which is a tail point of the tube yoke fitting portion 11j at the inner peripheral side of the cylinder of the tube yoke 11. A tube yoke length Tw is a length of the tube yoke 11 based on the connection reference point HJ.

Further, the shaft yoke 14 includes a shaft yoke fitting portion 14j which is fittable to the tube yoke 11 at the outer peripheral side of the cylinder of the shaft yoke 14, a shaft yoke fitting leading end portion 14a which is a leading point of the shaft yoke fitting portion 14j, and a shaft yoke fitting tail end portion 14b which is a tail point of the shaft yoke fitting portion 14j. A shaft yoke length Sw is a length of the shaft yoke 14 based on the connection reference point GJ.

The tube yoke fitting portion length Lw is a length of the tube yoke fitting portion 11j, and the shaft yoke fitting portion length Swj is a length of the shaft yoke fitting portion 14j. A distance between the connection reference point HJ and the connection reference point GJ is referred to as a joint length W. The tube yoke 11 and the shaft yoke 14 are disposed so as to be fitted between the connection reference point HJ and the connection reference point GJ. For this reason, the tube yoke length Tw and the shaft yoke length Sw are smaller than the joint length W.

Further, a fitting length JW in which the tube yoke fitting portion 11j and the shaft yoke fitting portion 14j are fitted to each other is equal to the shaft yoke fitting portion length Swj by matching the positions of the tube yoke fitting leading end portion 11a and the shaft yoke fitting leading end portion 14a. In this way, when the positions of the tube yoke fitting leading end portion 11a and the shaft yoke fitting leading end portion 14a are matched, the fitting length JW may be easily managed. On the other hand, in the specification of the intermediate shaft module 10 of which the fitting length JW is different, there is a need to design a new combination of the tube yoke 11 and the shaft yoke 14. Accordingly, there is a concern that cost increases due to an increase in the number of production components to be managed.

As described above, in the steering device 102, the intermediate shaft module 10 transmits a steering force between the steering shaft 120 and the steering gear 61. For this reason, there is a concern that a load may be applied to the intermediate shaft module 10 from a plurality of directions. Accordingly, there is a need to design the intermediate shaft module so as to satisfy the fitting length specification which is a condition of the fitting length in response to the joint length W that prevents a backlash by a predetermined bending strength or more.

Further, the intermediate shaft module 10 may protect the driver in the event of a collision by being contracted in the entire length with the impact generated by the collision of the vehicle. The contracted distance is a collision contraction length Rw, and is a distance in which the shaft yoke 14 is movable inside the tube yoke 11 by releasing the fitting between the tube yoke 11 and the shaft yoke 14 when the impact is applied to the S axis. For example, as illustrated in FIG. 4, the collision contraction length Rw is a distance from the shaft yoke fitting tail end portion 14b to the cross joint 41. Further, when the fitting length JW increases, the collision contraction length Rw decreases.

The design assistance device 1 for the steering device according to the embodiment may provide an option of a combination of the tube yoke 11 and the shaft yoke 14 which satisfies both conditions, the fitting length specification which prevents a backlash by a predetermined bending strength or more and the collision contraction length specification which is a condition of the collision contraction length according to the specification (restriction) of the vehicle. Next, the procedure of the process of the design assistance device 1 for the steering device will be described.

Figure 5:
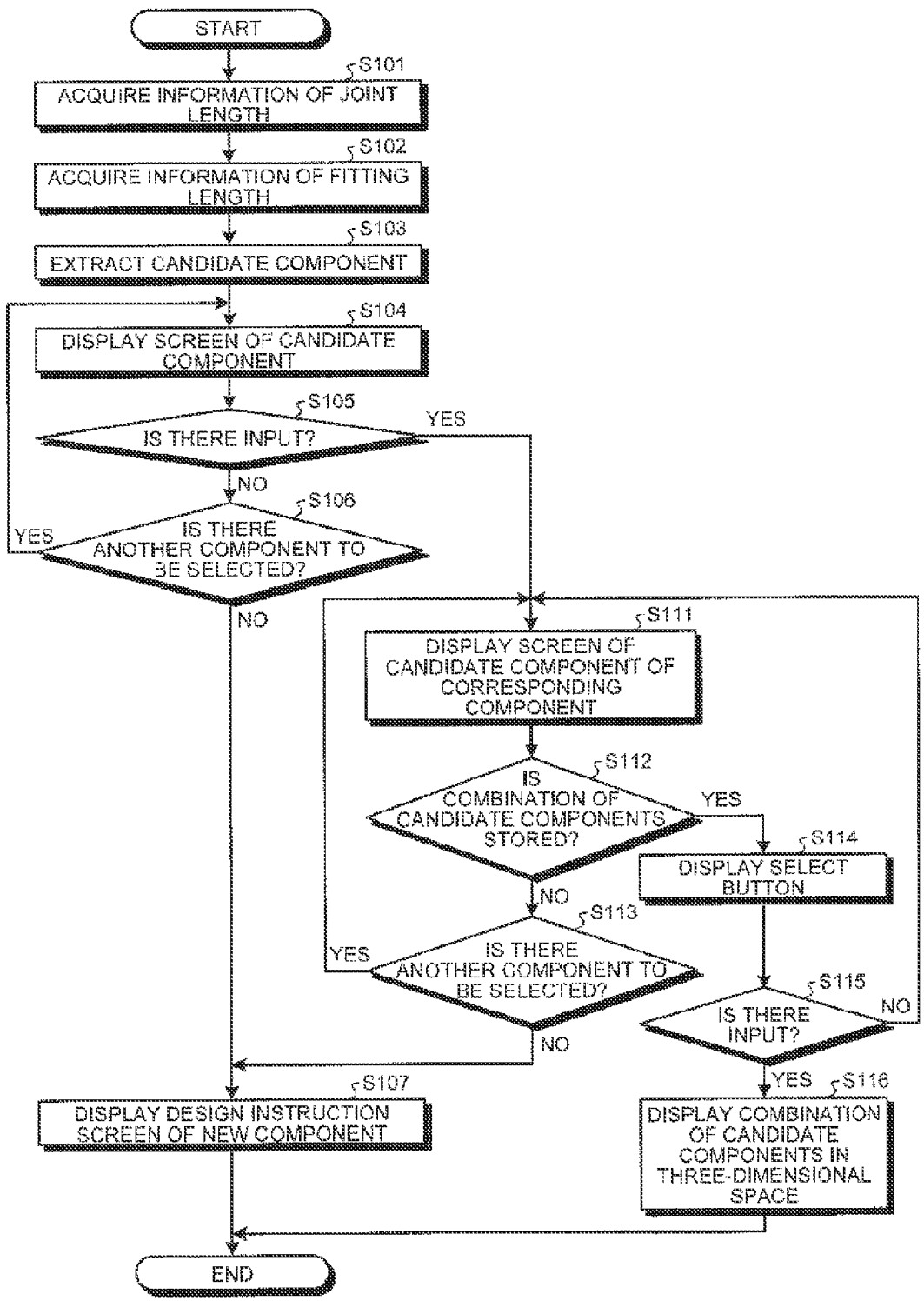
FIG. 5 is a flowchart illustrating a procedure of a process of a design assistance device for a steering device according to First Embodiment.
Figures 1, 12:
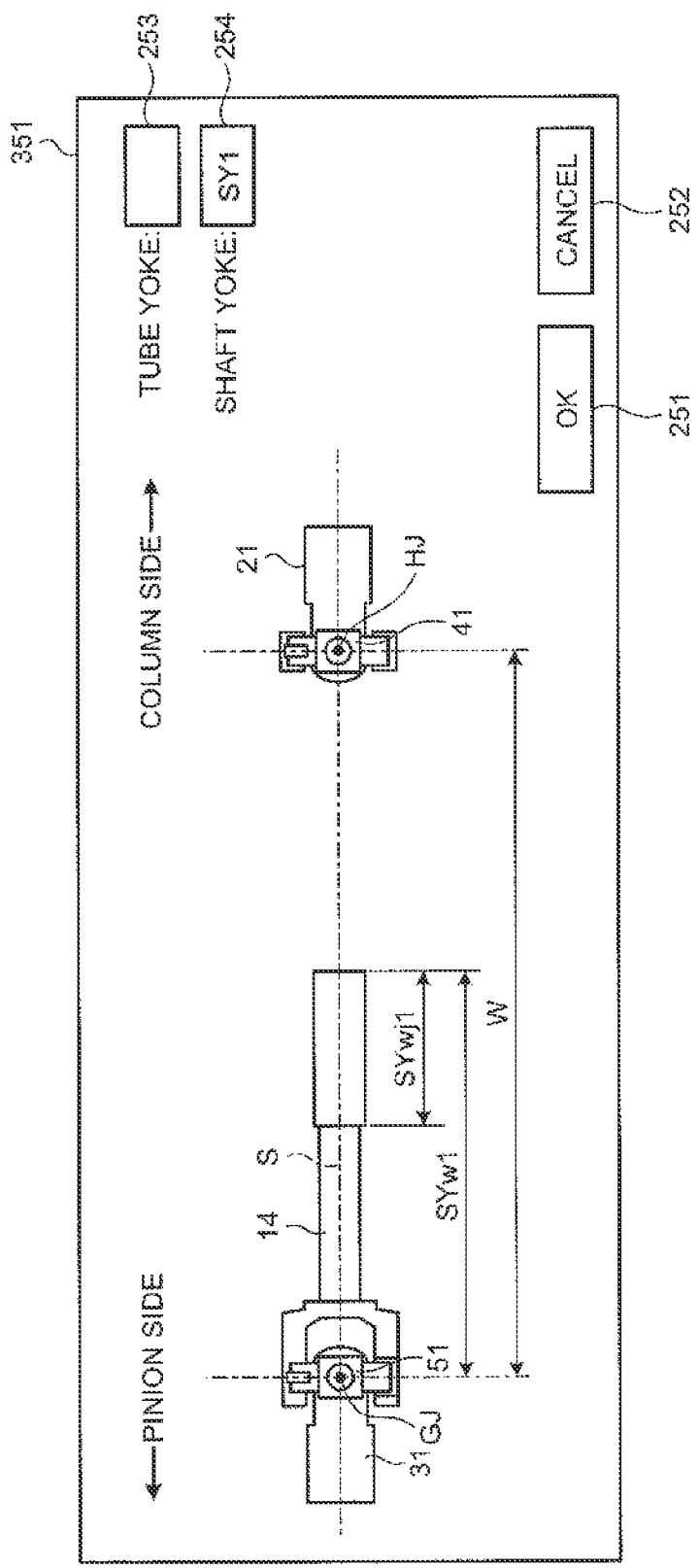
Figures 2, 12:
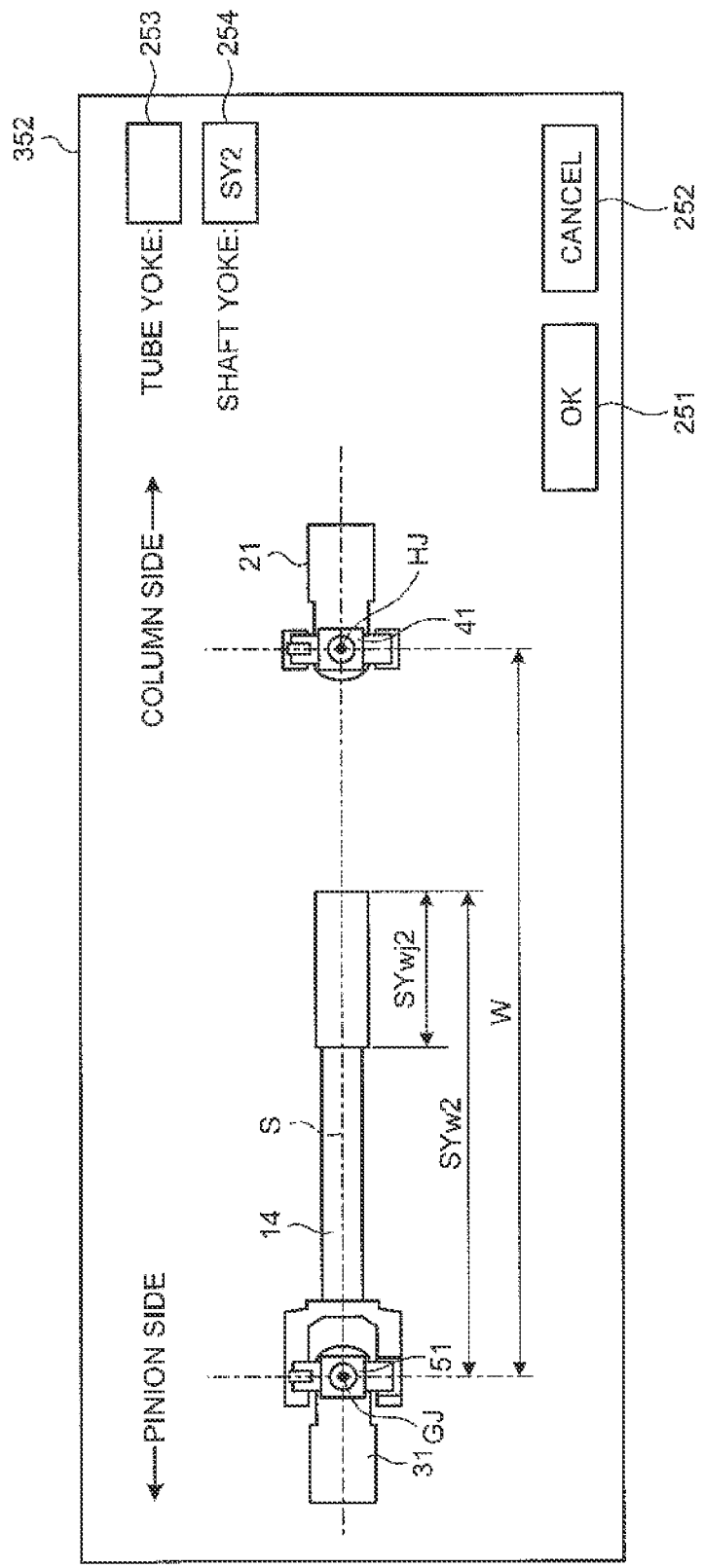
Figures 3, 12:
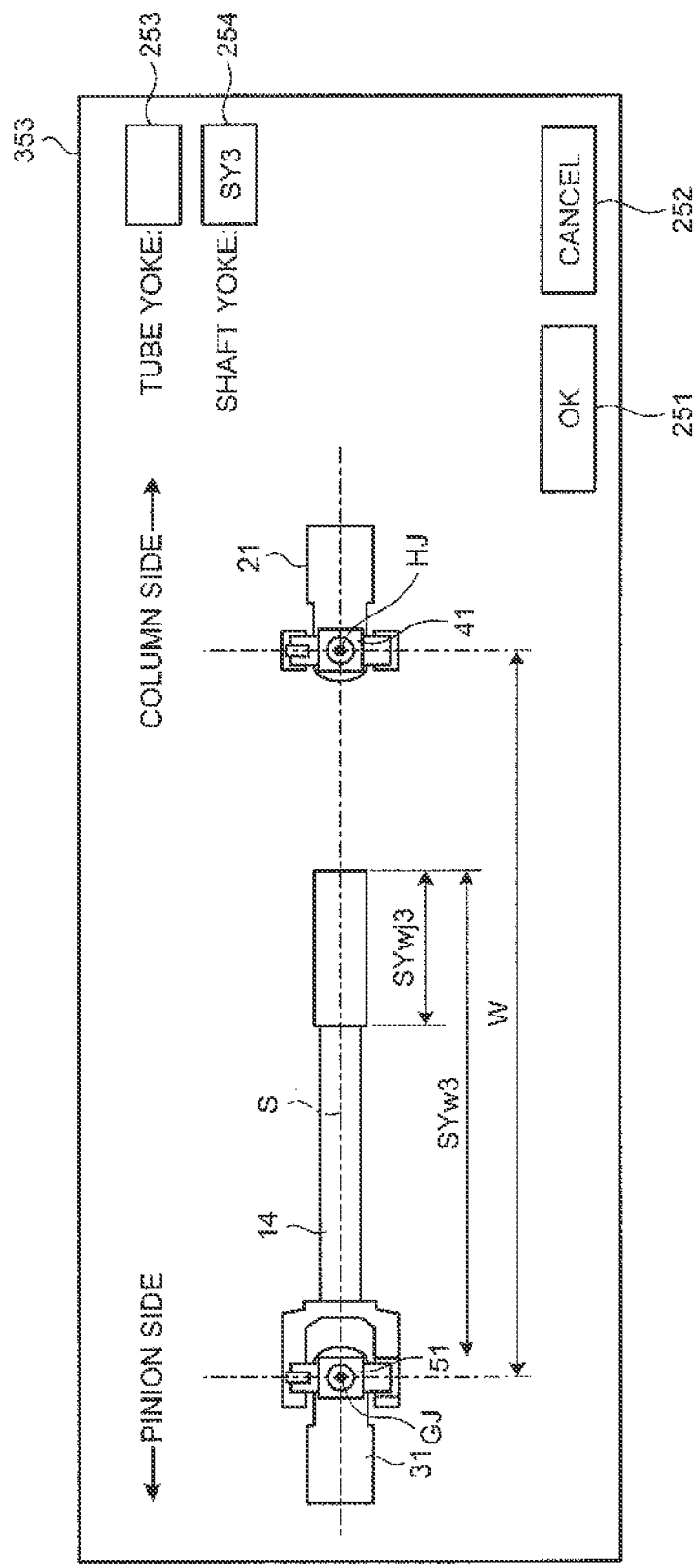
Figures 4, 12:
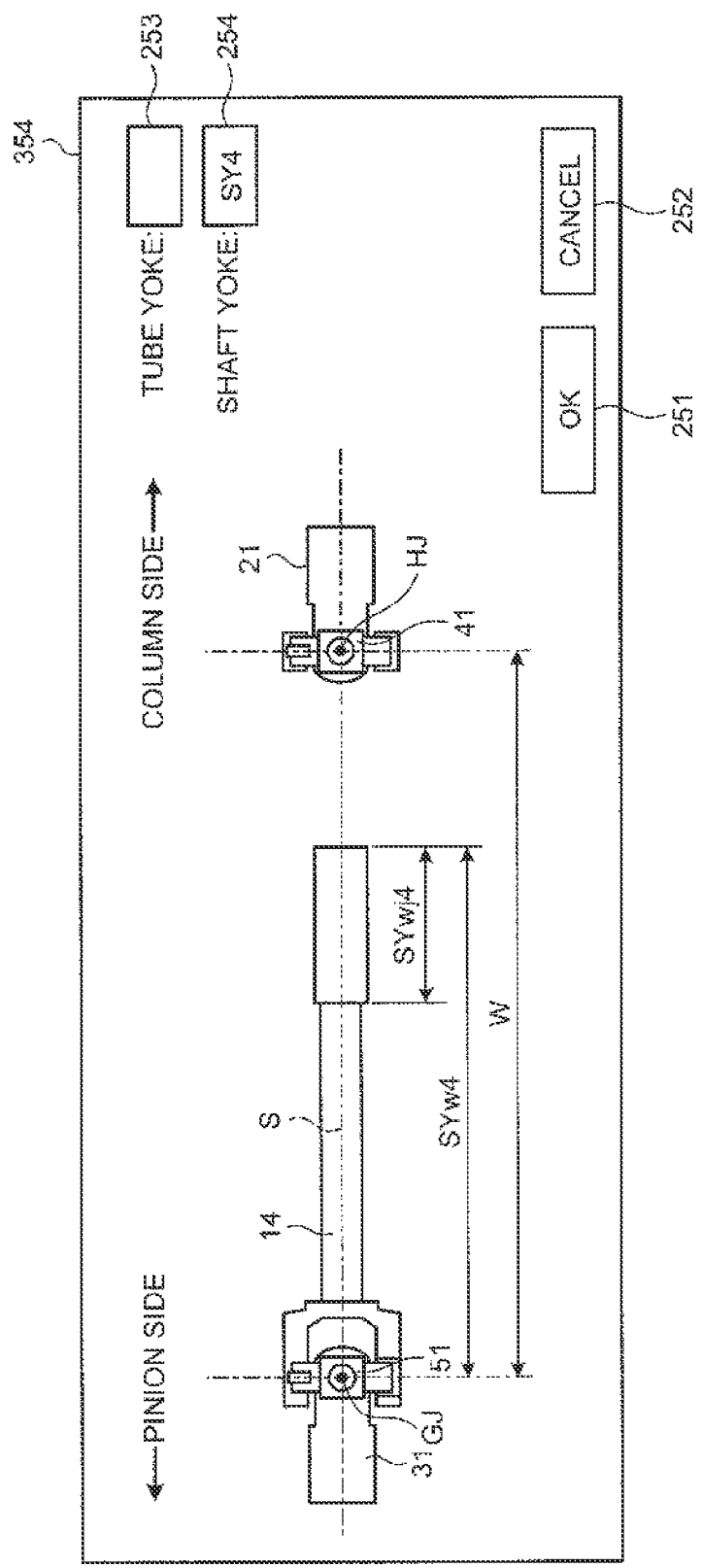
Figures 6, 12:
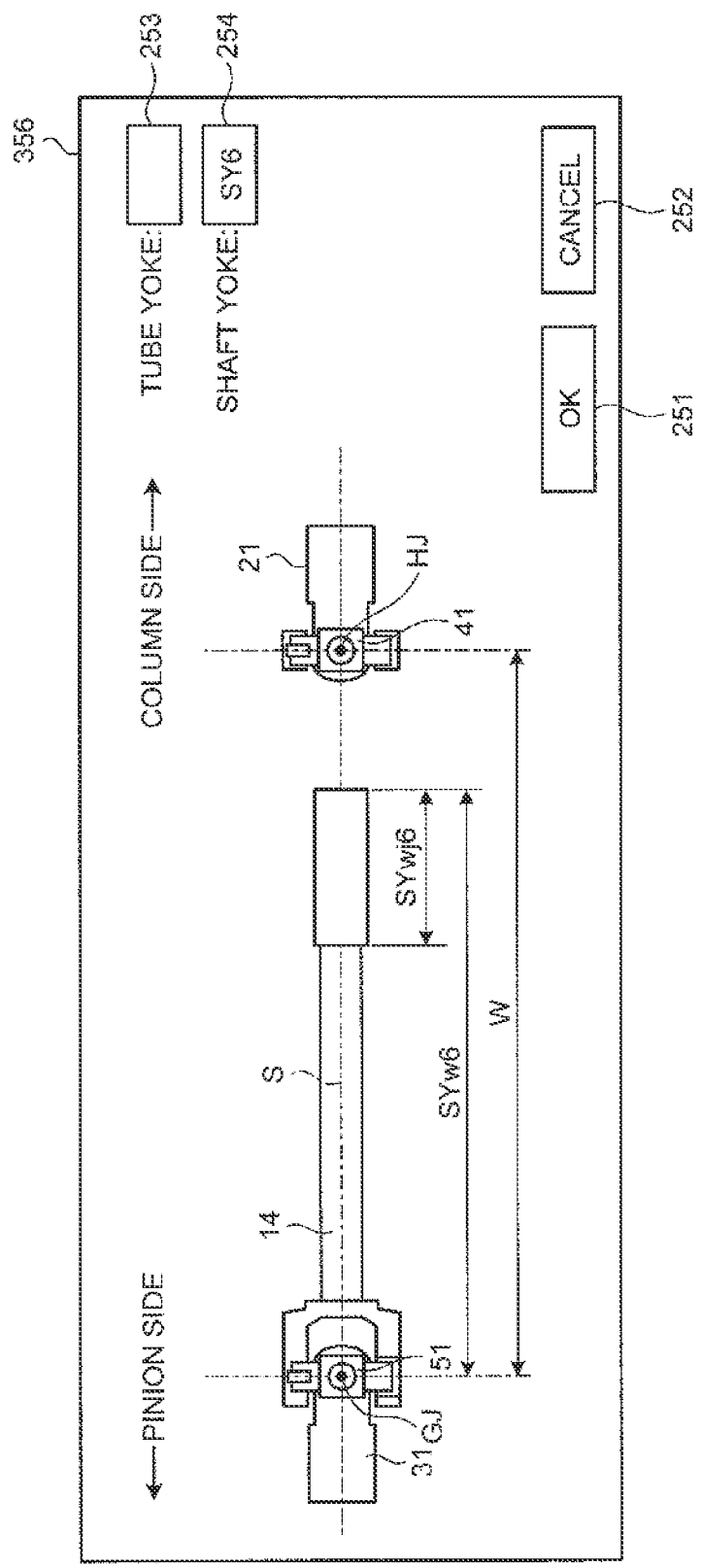

FIG. 5 is a flowchart illustrating a procedure of a process of the design assistance device for the steering device according to First Embodiment. First, the control device 4 of the design assistance device 1 for the steering device acquires information of the joint length of the steering device 102 (step S101). For example, the CPU 4c of the control device 4 reads out information of the joint length W stored in the external storage device 5 or the internal storage device 4f as design information of the vehicle input from the input device 2, and then stores the information in the RAM 4e. FIG. 6 is a diagram illustrating an example of a design information input screen. Further, the design information is called, for example, the specification as the restriction condition of the vehicle 100.

A design information input screen 601 which is disposed on the above-described display device 3 includes, for example, an input section 611, an input section 621, an input section 631, an input section 641, and an input section 651. The input section 611 may receive the input of the extension-contraction type of the control device 4. The fitting type between the tube yoke fitting portion 11j and the shaft yoke fitting portion 14j is classified into, for example, the type using a resin, the type of caulk-fitting, the type of state of serration, and the like.

In addition, the control device 4 may receive the input of the option of the case where the tube yoke 11 is disposed on the column side (the tube column side) through the input section 621. Alternatively, the control device 4 may receive the input of the option of the case where the tube yoke 11 is disposed on the pinion side (where the tube is on the pinion side) through the input section 621. In this way, the input section 611 and the input section 621 are, for example, displayed as a radio button, and only one of the options may be selected.

The control device 4 may receive the input of information of a phase angle in the input section 631. Further, the control device 4 may receive the input of information of the joint length in the input section 641. Similarly, the control device 4 may receive the input of information of a collision contraction length specification as a condition of the collision contraction length in the input section 651.

The control device 4 stores the information input from the input device 2 through the input section 611, the input section 621, the input section 631, the input section 641, and the input section 651 in the RAM 4e. Therefore, the control device 4 stores the input information in the external storage device 5 or the internal storage device 4f.

Figures 7, 12:
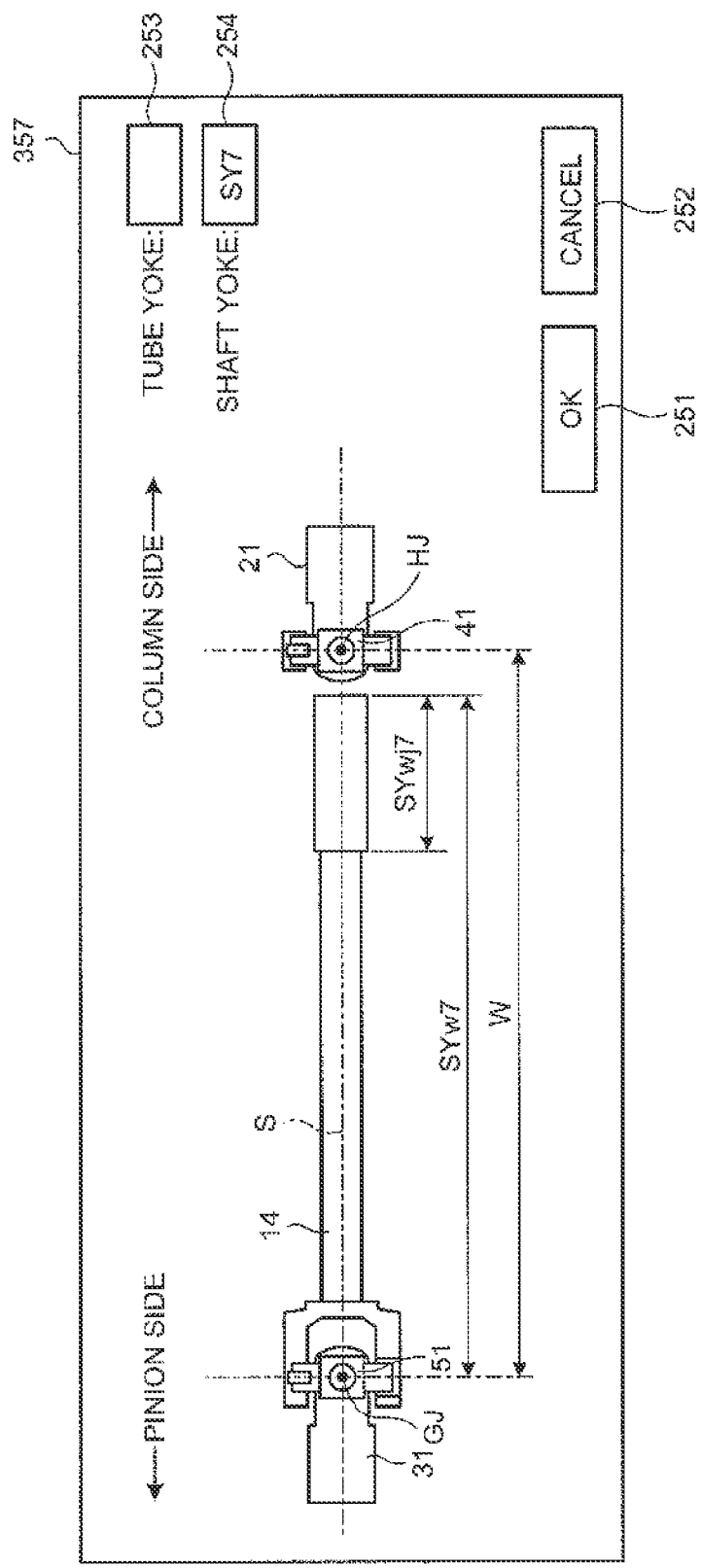

Next, the control device 4 acquires information of the fitting length (step S102). FIG. 7 is a diagram illustrating an example of a relation between the joint length and the fitting length. For example, the control device 4 stores the information of the condition of the fitting length corresponding to the joint length, for example, as a database 401 illustrated in FIG. 7 in the external storage device 5 or the internal storage device 4f.

The CPU 4c of the control device 4 gives the information of the joint length which is acquired in step S101 to the database 401, and acquires the information of the fitting length specification as the condition of the fitting length. As illustrated in FIG. 7, the control device 4 may acquire the information of the fitting length specification extracted from the database 401 from the information of the extension-contraction type in addition to the information of the joint length acquired in step S101. For example, as illustrated in FIG. 7, the CPU 4c gives the information of the joint length W and the extension-contraction type A to the database 401, and extracts the fitting length specification Wa. Further, the control device 4 may also receive the condition of the fitting length as the fitting length specification in the design information input screen 601 illustrated in FIG. 6, and store the information of the fitting length specification in the external storage device 5 or the internal storage device 4f.

Next, the control device 4 calls the existing component database stored in the internal storage device 4f or the external storage device 5, gives the information of the joint length acquired in step S101 to the existing component database, and extracts the candidate component (step S103). FIG. 8-1 is a diagram illustrating an example of the information of the existing component of the tube yoke. FIG. 8-2 is a diagram illustrating an example of the information of the existing component of the shaft yoke.

As illustrated in FIG. 8-1, an existing component database 320 stores existing component data of a tube yoke which is designed already, and stores, for example, information of a drawing number, an extension-contraction specification, and a tube yoke length Tw which are correlated with each other in the internal storage device 4f or the external storage device 5. Further, as illustrated in FIG. 8-2, the existing component database 330 stores an existing component data of a shaft yoke which is designed already, and for example, stores information of a drawing number, an extension-contraction specification, and a shaft yoke length Sw which are correlated with each other in the internal storage device 4f or the external storage device 5.

The CPU 4c of the control device 4 gives the information of the joint length which is acquired in step S101 to the existing component database 320, and for example, extracts the candidate component of the tube yoke in which the tube yoke length stored in the existing component database 320 is smaller than the joint length. FIG. 8-3 is a diagram illustrating an example of the candidate component of the tube yoke. In FIG. 8-3, the drawing numbers TY1, TY2, TY3, and TY4 which are extracted as the candidate components are displayed as a candidate component list 325 on the display screen 321 together with the extension-contraction specification and the tube yoke length Tw. For example, it is desirable that the drawing number of the selected candidate component 323 is highlighted compared to the drawing number of the unselected candidate component as illustrated in, for example, FIG. 8-3.

Alternatively, the CPU 4c of the control device 4 gives the information of the joint length which is acquired in step S101 to the existing component database 330, and extracts, for example, the candidate component of the shaft yoke in which the shaft yoke length stored in the existing component database 330 is smaller than the joint length. FIG. 8-4 is a diagram illustrating an example of the candidate component of the shaft yoke. In FIG. 8-4, the drawing numbers SY1 to SY7 which are extracted as the candidate component are displayed as the candidate component list 335 on the display screen 331 together with the extension-contraction specification and the tube yoke length Tw. For example, it is desirable that the drawing number of the selected candidate component 333 is highlighted compared to the drawing number of the unselected candidate component as illustrated in, for example, FIG. 8-4.

As described above, the control device 4 may extract the candidate component of the tube yoke and the candidate component of the shaft yoke included in the joint length acquired in step S101 from the information of the existing component using the CPU 4c and the existing component databases 320 and 330 as a candidate component extraction unit.

Next, the control device 4 displays the candidate component extracted in step S103 on the display device 3 (step S104). The control device 4 may assist the designer to select the candidate component by displaying the candidate component list 321 or the candidate component list 331 on the screen. FIG. 9 is a diagram illustrating an example of the input unit. For example, the designer selects the candidate component from the screen of displaying the candidate component list 321 or the candidate component list 331 by a keyboard 201 as an input unit of the input device 2.

The control device 4 allocates an up cursor key 211 and a down cursor key 221 in the keyboard 201 illustrated in FIG. 9 as an input unit which is used to select the candidate component 323 or the candidate component 333 from the candidate component list 325 or the candidate component list 335. Alternatively, the control device 4 allocates a left cursor key 231 and a right cursor key 241 in the keyboard 201 illustrated in FIG. 9 as an input unit which is used to select the candidate component 323 or the candidate component 333 from the candidate component list 325 or the candidate component list 335.

FIG. 10 is a diagram illustrating an example of the initial screen of the output display screen. The control device 4 displays an output display screen 340 illustrated in FIG. 10 on the display device 3. The output display screen 340 displays the connection reference point HJ and the connection reference point GJ. For this reason, the designer may intuitively recognize the joint length W on the output display screen 340.

When the designer selects a select button 251 through a mouse or a keyboard as the input device 2, the control device 4 may receive the information which is determined by the designer through the input interface 4a. Further, when the designer selects a process stop button 252 through a mouse or a keyboard as the input device 2, the control device 4 may receive an instruction for stopping the process of the control device 4 according to the intension of the designer through the input interface 4a. It is desirable that the output display screen 340 includes a tube yoke drawing number display section 253 and a shaft yoke drawing number display section 254. Accordingly, the designer may recognize the drawing number of the candidate component 323 or the candidate component 333 selected from the candidate component list 325 or the candidate component list 335.

Figures 1, 11:
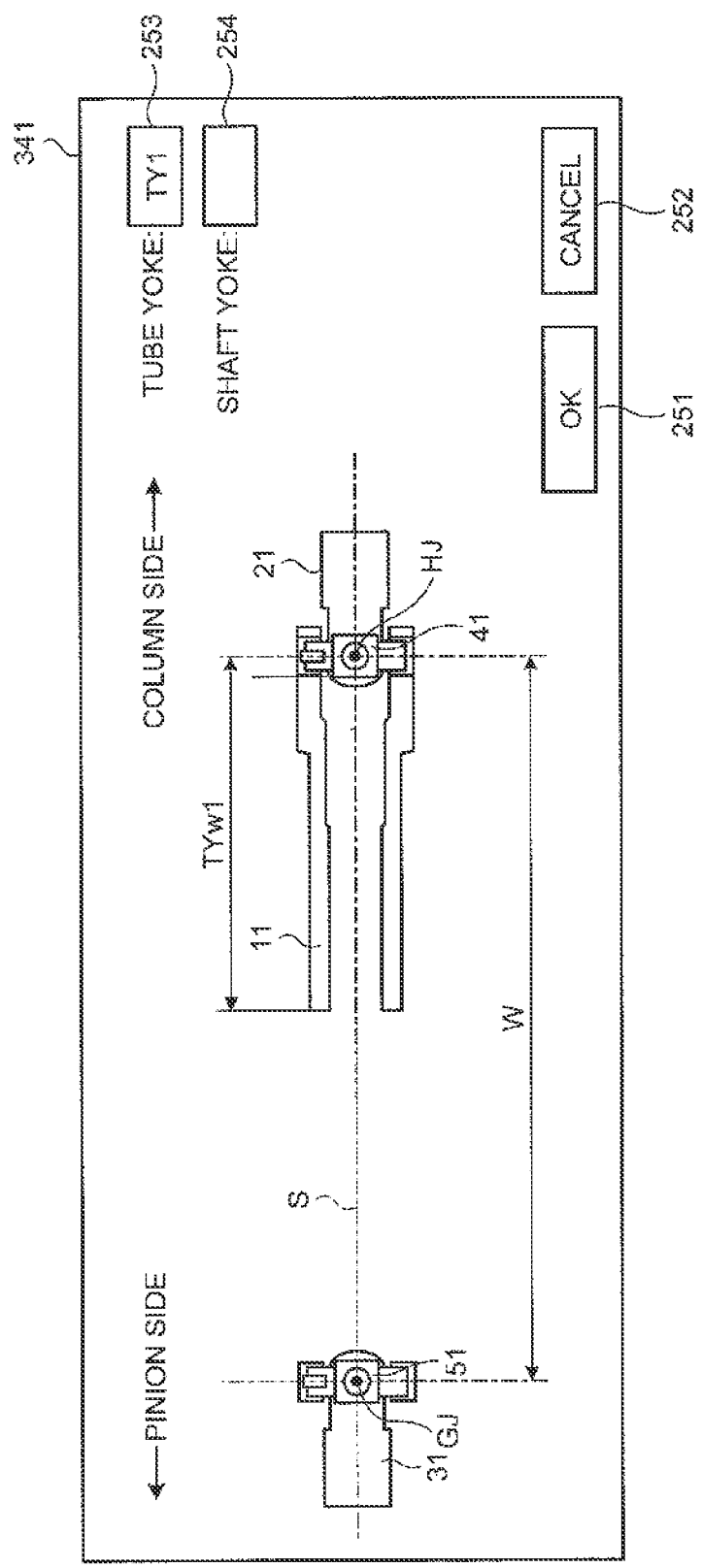
Figures 2, 11:
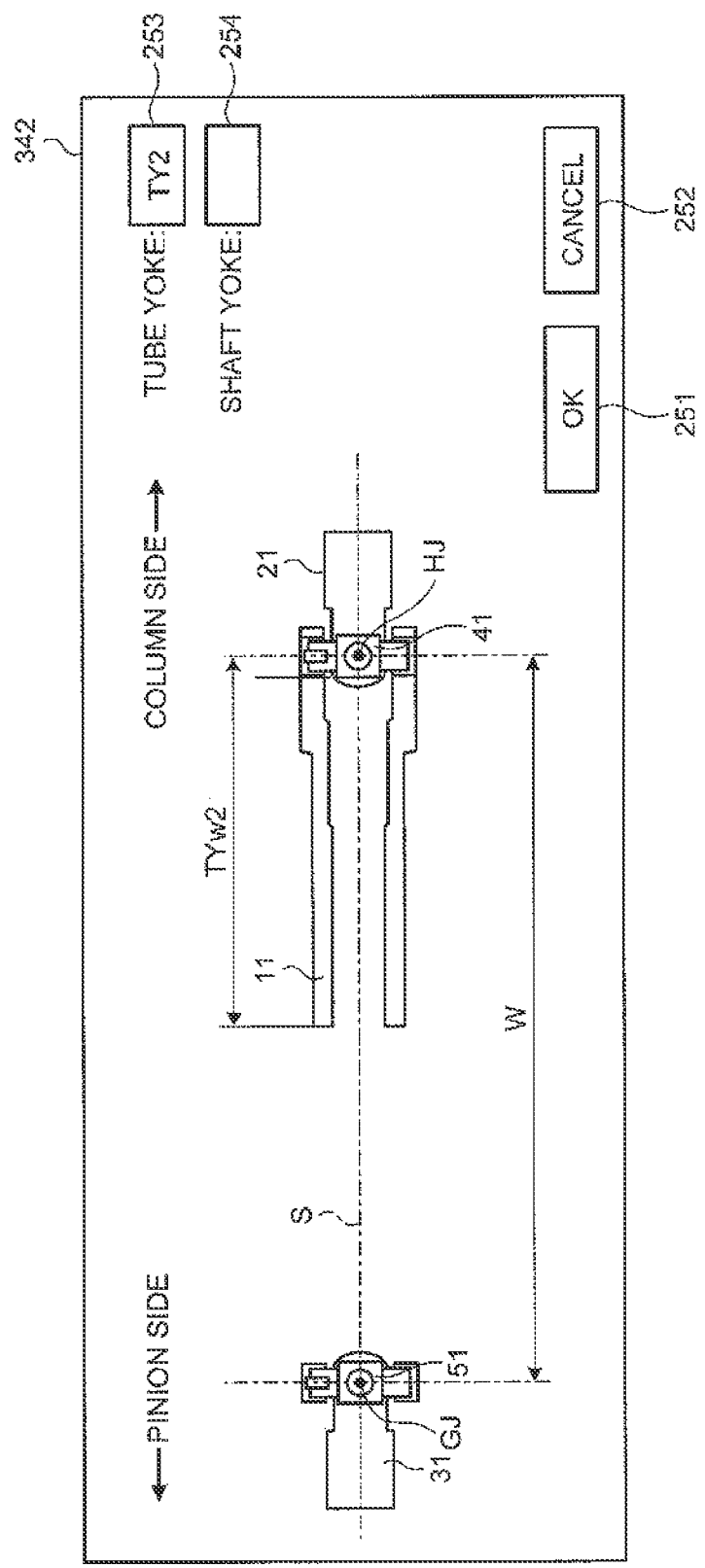
Figures 3, 11:
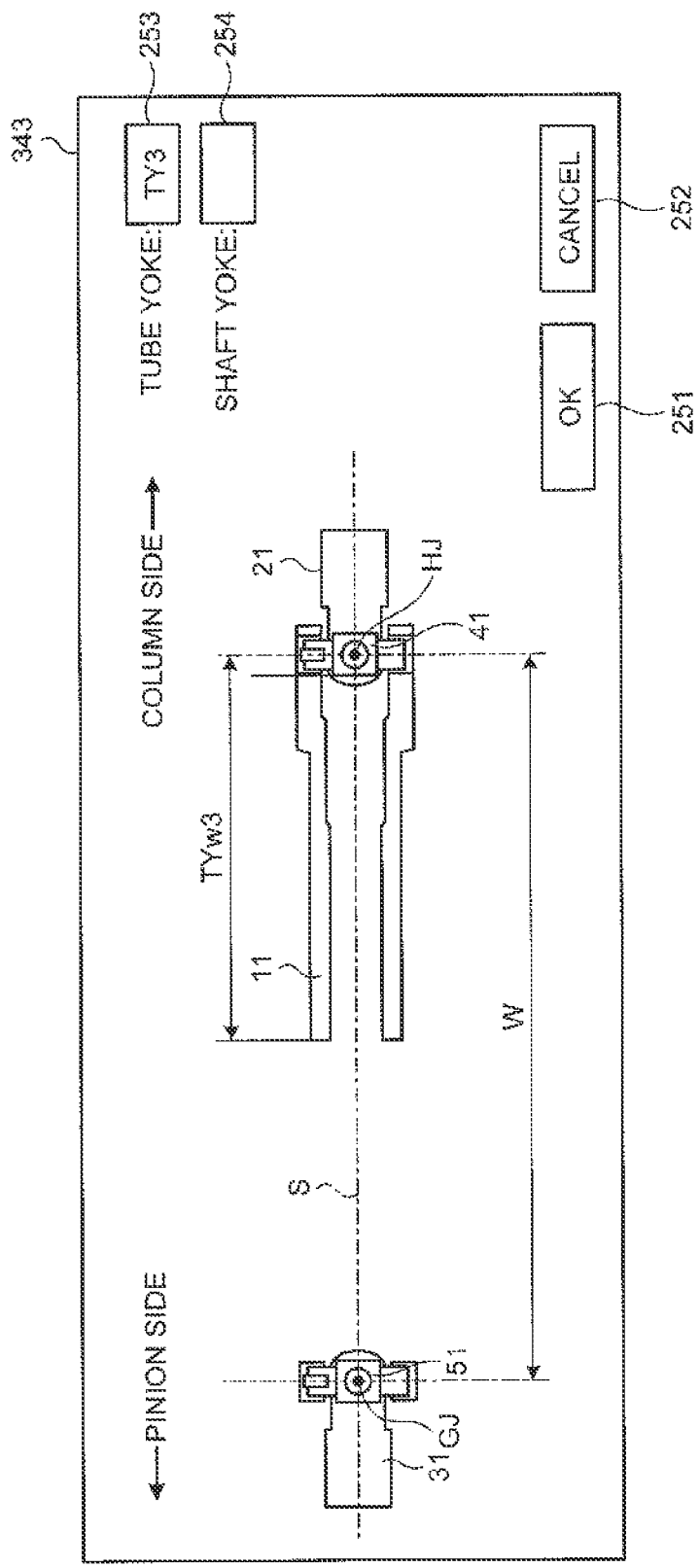
Figures 4, 11:
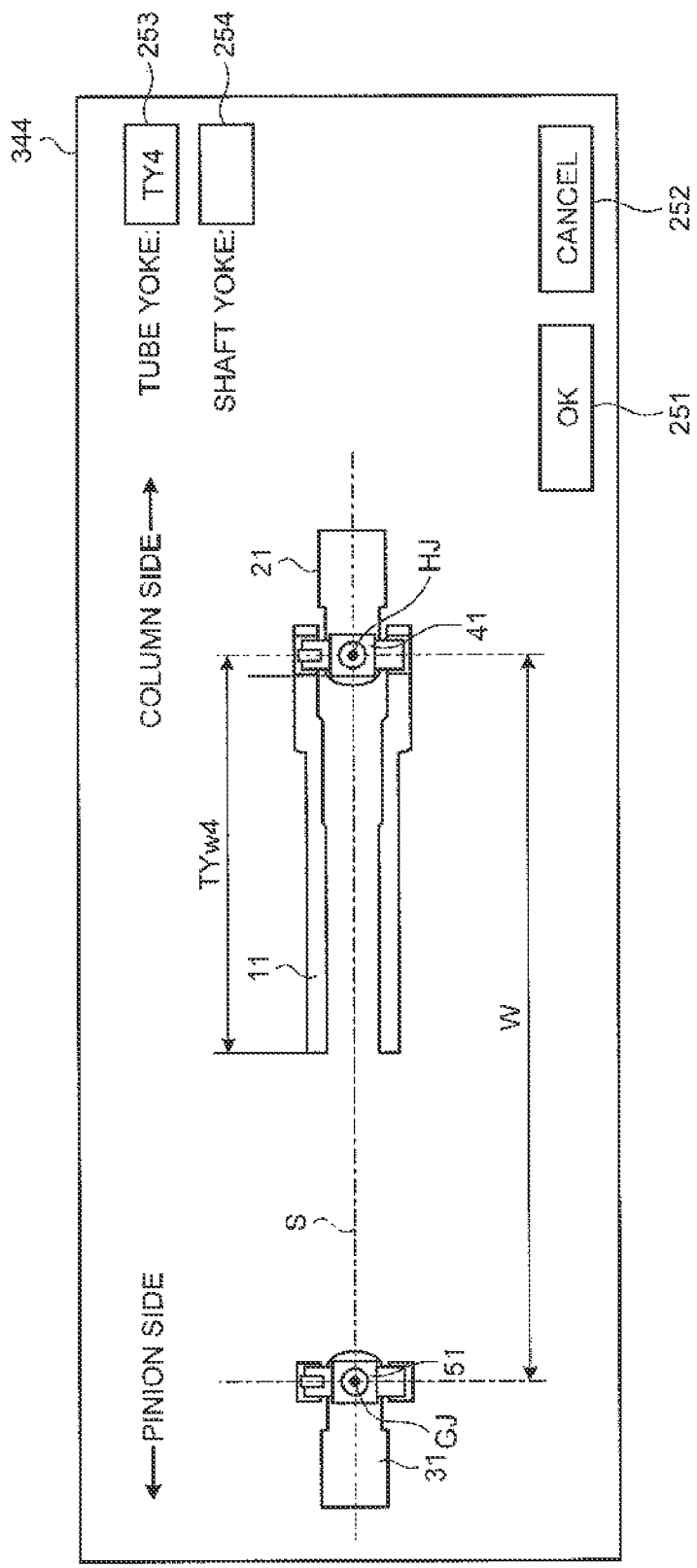

For example, the designer operates the up cursor key 211 and the down cursor key 221 illustrated in FIG. 9 and selects the candidate component 323 among the candidate component list 325. The control device 4 calls the drawing information of the candidate component 323 selected from the candidate component list 325 illustrated in FIG. 8-3 from the internal storage device 4f or the external storage device 5, and displays the drawing information so as to be superimposed on the output display screen 340 illustrated in FIG. 10. FIGS. 11-1 to 11-4 are diagrams illustrating the output display screen which displays an example of the candidate component of the tube yoke.

As illustrated in FIGS. 11-1 to 11-4, the shape of the tube yoke 11 changes in synchronization with the display of the drawing numbers (the drawing numbers of the selected candidate components) TY1, TY2, TY3, and TY4 of the tube yoke drawing number display section 253. Further, the tube yoke length Tw of the tube yoke 11 changes to TYw1, TYw2, TYw3, and TYw4 in synchronization with the display of the drawing numbers TY1, TY2, TY3, and TY4 of the tube yoke drawing number display section 253. For this reason, the designer checks the tube yoke length Tw of the output display screen 344 from the output display screen 341, and hence easily determines the component to be selected.

Alternatively, the designer operates the up cursor key 211 and the down cursor key 221 illustrated in FIG. 9, and selects the candidate component 333 from the candidate component list 335. The control device 4 calls the drawing information of the candidate component 333 selected from the candidate component list 335 illustrated in FIG. 8-4 from the internal storage device 4f or the external storage device 5, and displays the drawing information so as to be superimposed on the output display screen 340 illustrated in FIG. 10. FIGS. 12-1 to 12-7 are diagrams illustrating the output display screen which displays an example of the candidate component of the shaft yoke.

As illustrated in FIGS. 12-1 to 12-7, the shape of the shaft yoke 14 changes in synchronization with the display of the drawing numbers (the drawing numbers of the selected candidate components) SY1, SY2, SY3, SY4, SY5, SY6, and SY7 of the display of the shaft yoke drawing number display section 254. Further, the shaft yoke length Sw of the shaft yoke 14 changes to SYw1, SYw2, SYw3, SYw4, SYw4, SYw5, SYw6, and SYw7 in synchronization with the drawing numbers SY1, SY2, SY3 SY4, SY5, SY6, and SY7 of the shaft yoke drawing number display section 254. Further, the shaft yoke fitting portion length Swj changes to SYwj1, SYwj2, SYwj3, SYwj4, SYwj4, SYwj5, SYwj6, and SYwj7 in synchronization with the display of the drawing numbers SY1, SY2, SY4, SY5, SY6, and SY7 of the shaft yoke drawing number display section 254. For this reason, the designer checks the shaft yoke length Sw of the output display screen 357 from the output display screen 351, and hence easily determines the component to be selected.

As described above, the control device 4 may assist the determination of the designer who selects the candidate component in any one of the tube yoke 11 and the shaft yoke 14. Next, as a result of the assist, when the designer selects the process stop button 252 and there is no input of the select button 251 (No in step S105), the control device 4 does not store the selected component in the internal storage device 4f or the external storage device 5. In this case, the control device 4 advances the process to step S106. In step S106, when there is another component to be selected (Yes in step S106), the control device 4 returns the process to step S104, and displays the screen of the candidate component. When there is not another component to be selected (No in step S106), the process advances to step S107. The control device 4 displays a screen of a design instruction for prompting a design of a new component on the display device 3 (step S107).

Further, when there is an input of the select button 251 from the designer who inputs the select button 251 through the input device 2 such as a mouse or a keyboard (Yes in step S105), the control device 4 stores the selected component in the internal storage device 4f or the external storage device 5. Next, the control device 4 advances the process to step S111.

Further, the control device 4 displays a screen of the candidate component of the corresponding component (step S111). For example, when there is an input of the select button 251 (Yes in step S105) and the component to be stored in the internal storage device 4f or the external storage device 5 is the tube yoke, the corresponding component is the shaft yoke. Alternatively, when there is an input of the select button 251 (Yes in step S105) and the component to be stored in the internal storage device 4f or the external storage device 5 is the shaft yoke, the corresponding component is the tube yoke.

Figures 1, 13:
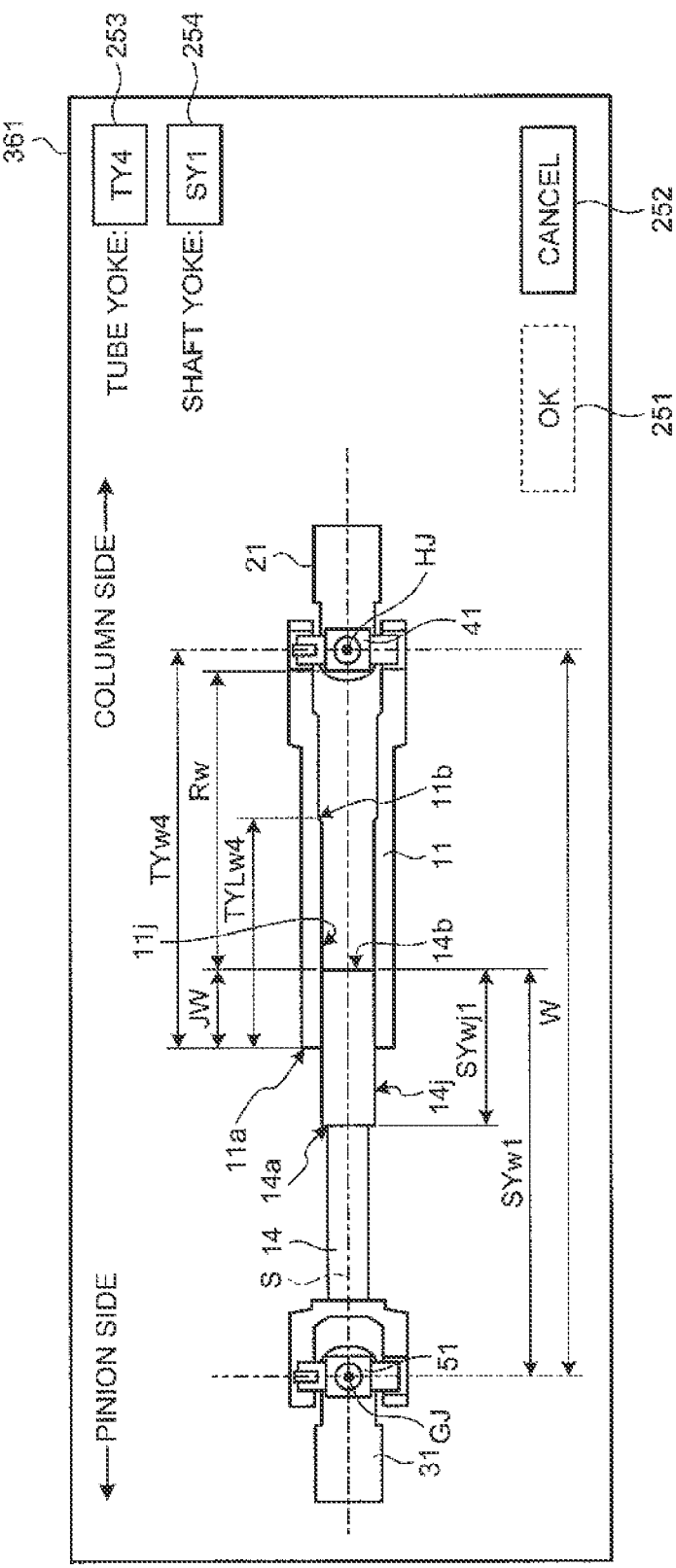
Figures 2, 13:
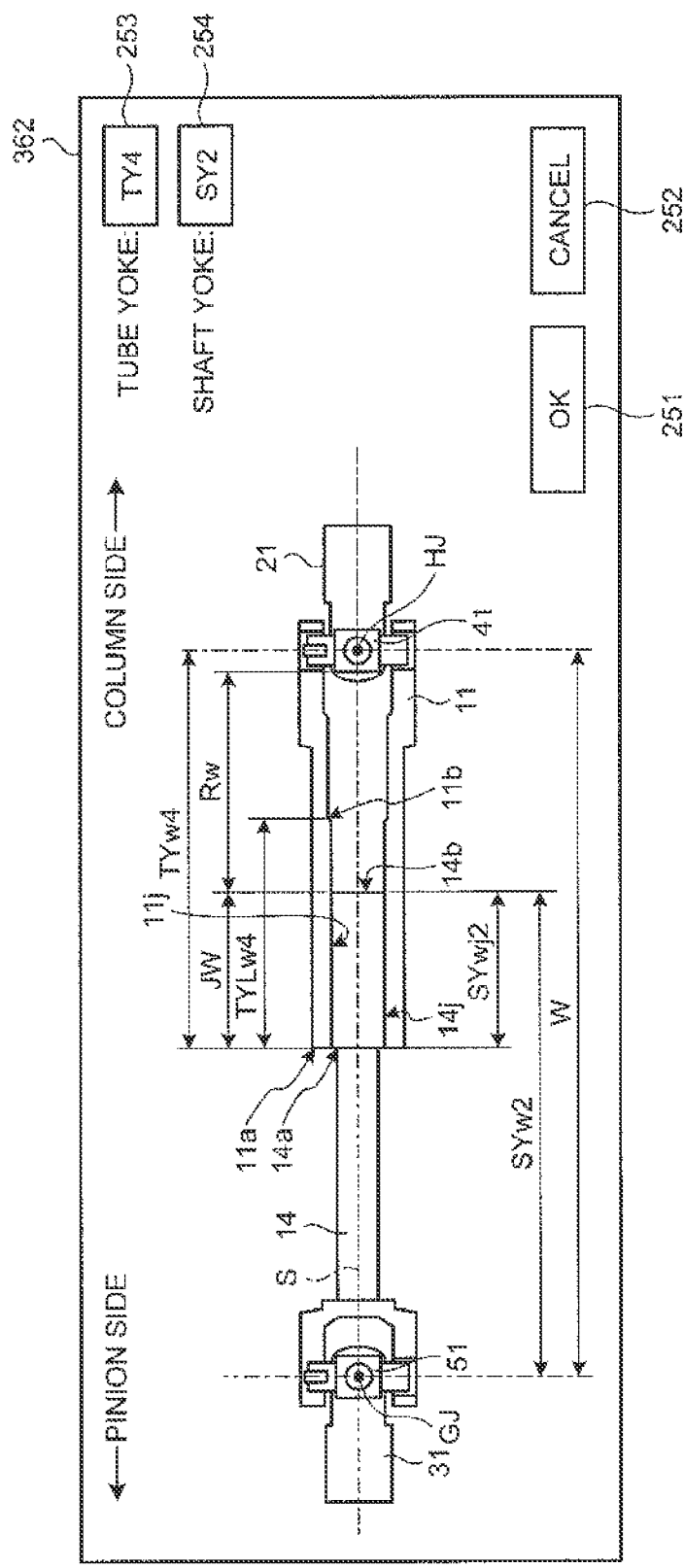
Figures 3, 13:
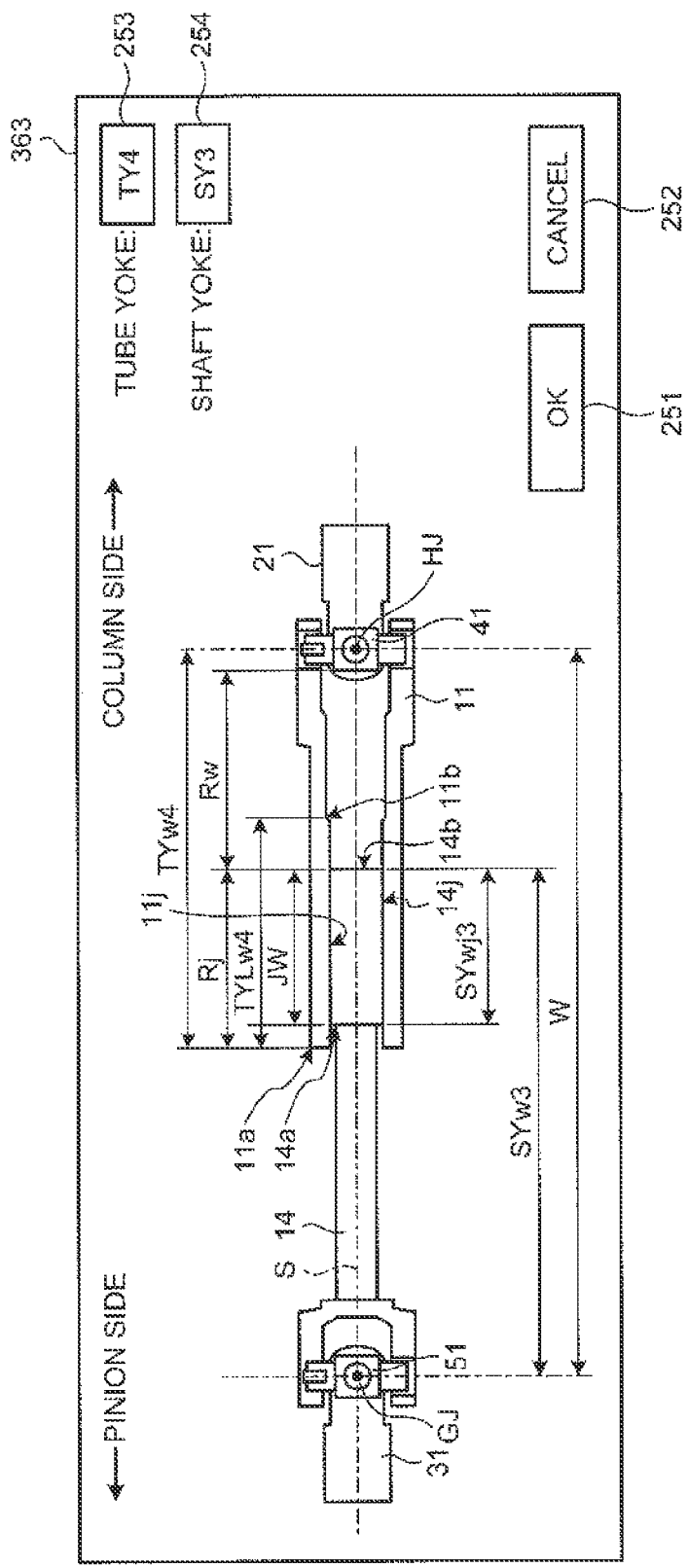
Figures 4, 13:
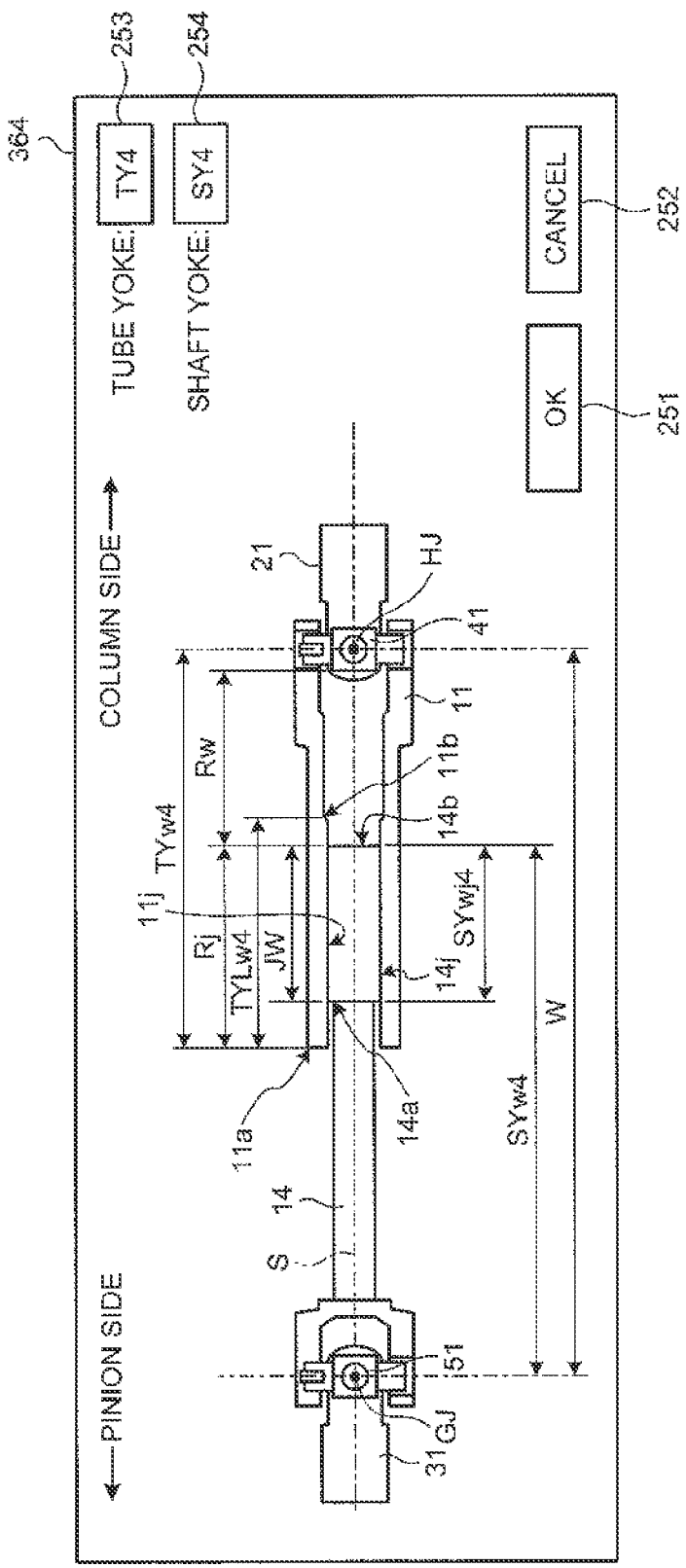
Figures 5, 13:
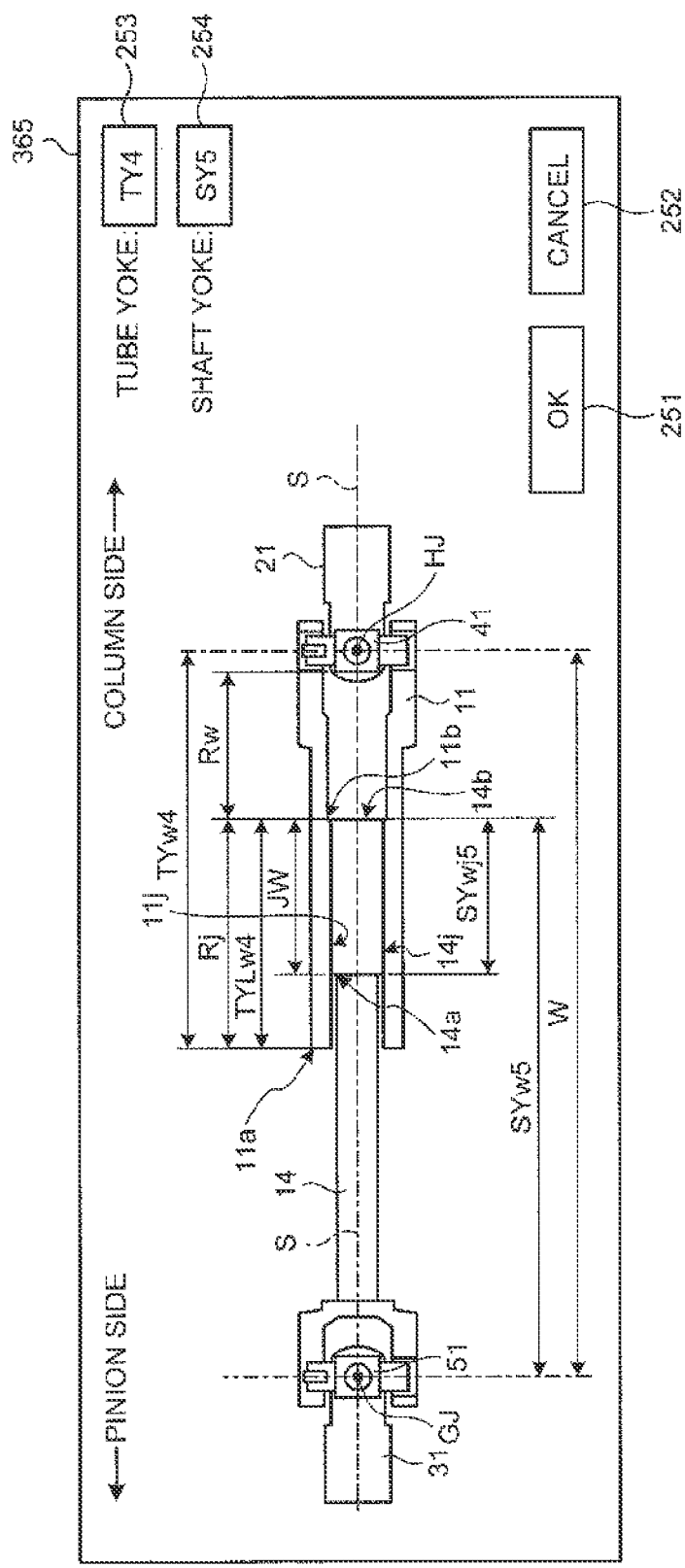
Figures 6, 13:
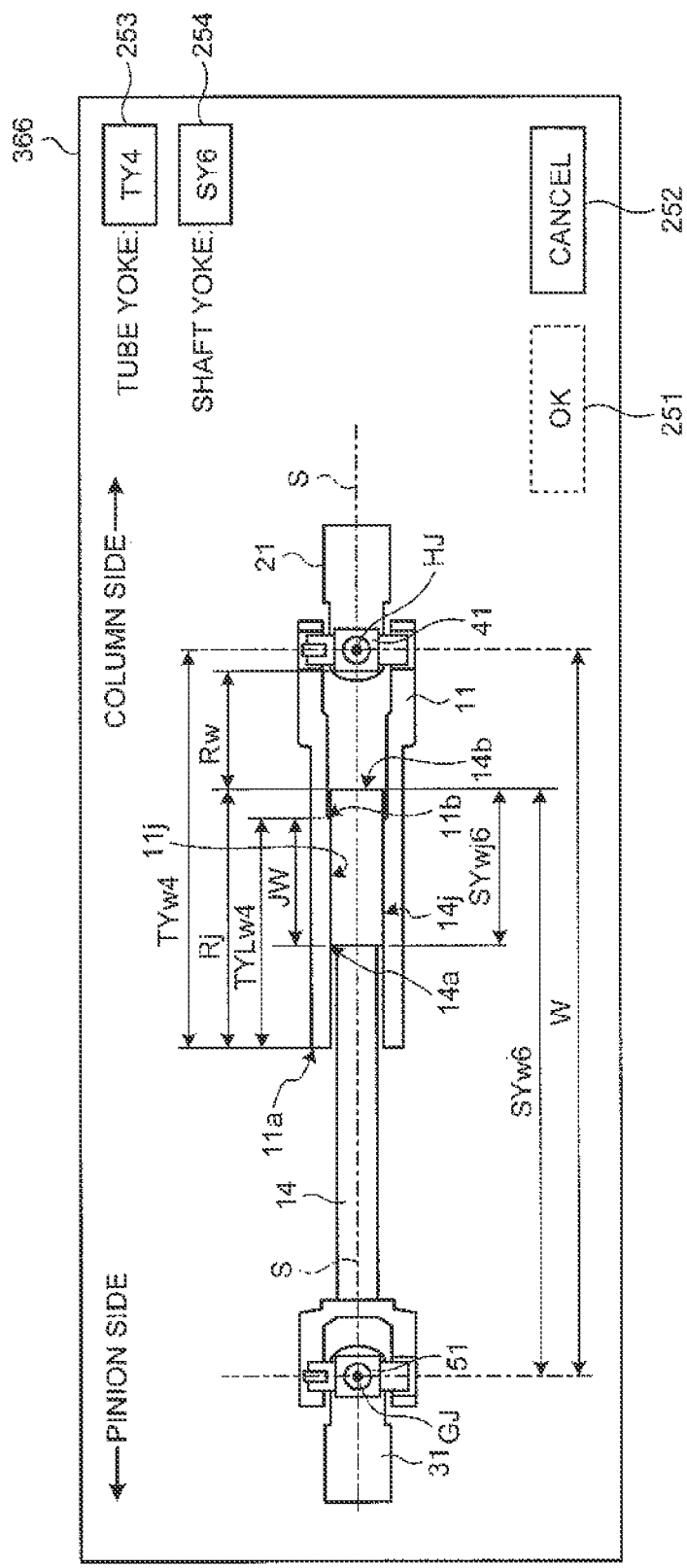
Figures 7, 13:
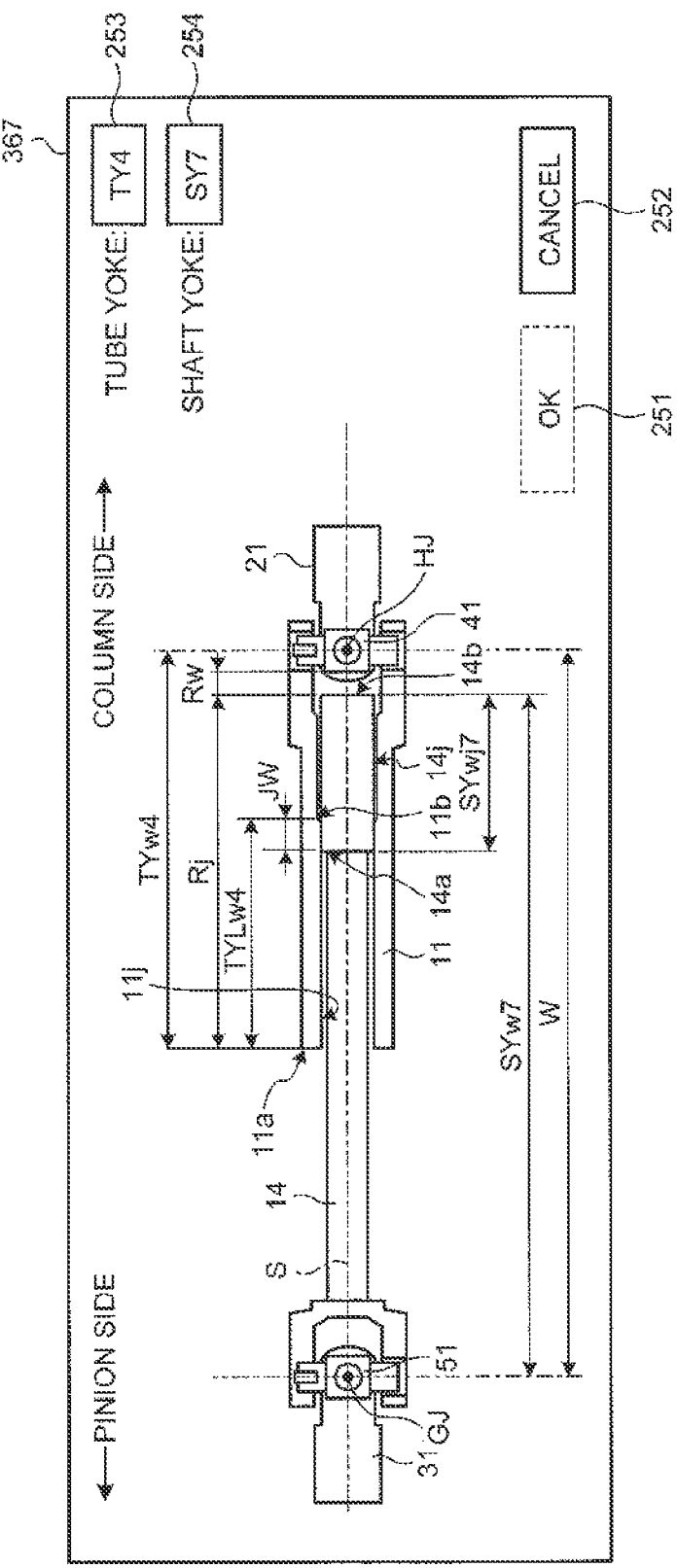

For example, the selected component is set as the tube yoke illustrated in FIG. 13-4. The control device 4 displays the candidate component list 335 illustrated in FIG. 8-4 as the screen of the candidate component of the corresponding component. The designer operates the up cursor key 211 and the down cursor key 221 illustrated in FIG. 9, and selects the candidate component 333 from the candidate component list 335. The control device 4 calls the drawing information of the candidate component 333 selected from the candidate component list 335 illustrated in FIG. 8-4 from the internal storage device 4f or the external storage device 5, and displays the drawing information so as to be superimposed on the output display screen 344 illustrated in FIG. 11-4.

FIGS. 13-1 to 13-7 are diagrams illustrating the output display screen which displays an example of the combination of the candidate components of the tube yoke and the shaft yoke. In FIGS. 13-1 to 13-7, the shape of the shaft yoke 14 changes in synchronization with the drawing number of the shaft yoke drawing number display section 254. For this reason, the designer checks the fitting length JW from an output display screen 361 to an output display screen 367, and hence easily determines the component to be selected.

In the control device 4, the CPU 4c calculates the fitting length JW in which the candidate component of the tube yoke and the candidate component of the shaft yoke are combined with each other. Therefore, the CPU 4c executes a calculation in which the fitting length JW is compared with the fitting length specification acquired in step S102. Next, when the fitting length JW satisfies the fitting length specification (Yes in step S112), the CPU 4c calculates an instruction for storing the combination of the candidate component of the tube yoke and the candidate component of the shaft yoke in the internal storage device 4f or the external storage device 5 as the storage unit.

Therefore, the display device 3 displays the select button 251 as an index indicating the calculated instruction (step S114). Next, the control device advances the process to step S115, so that it becomes a state where the input of the designer is awaited.

When the designer selects the select button 251 through the input device 2 such as a mouse or a keyboard (Yes in step S115), the information of the combination of the candidate components based on the instruction is stored in the internal storage device 4f or the external storage device 5. Therefore, the control device 4 advances the process to step S116. Alternatively, when the designer selects the select button 251 through the input device 2 such as a mouse or a keyboard (No in step S115), for example, when the designer stops the process procedure by the process stop button 252 through the input device 2, the control device 4 returns the process to step S111, and the display device 3 displays the screen of the candidate component of the corresponding component.

The fitting length JW in which the candidate component of the tube yoke and the candidate component of the shaft yoke are combined with each other satisfies the fitting length specification (No in step S112), the CPU 4c does not calculate an instruction for storing the combination of the candidate component of the tube yoke and the candidate component of the shaft yoke in the internal storage device 4f or the external storage device 5 as the storage unit.

Therefore, since there is no instruction, the display device 3 does not display the select button 251 as an index, and advances the process to step S113.

Next, when there is another component to be selected (Yes in step S113), the control device 4 returns the process to step S111, and displays the screen of the candidate component of the corresponding component. When there is not another component to be selected (No in step S113), the control device advances the process to step S107. The control device 4 displays a screen of a design instruction for satisfying a design of a new component on the display device 3 (step S107).

For example, when the fitting length specification acquired in step S102 is not satisfied (the fitting length JW is smaller than the fitting length specification) (No in step S112), the CPU 4c does not calculate an instruction for storing the combination of the candidate component of the tube yoke and the candidate component of the shaft yoke in the internal storage device 4f or the external storage device 5. For this reason, it becomes a state where an instruction for storing the combination of the candidate components of the tube yoke and the shaft yoke illustrated in FIG. 13-1 in the internal storage device 4f or the external storage device 5. Therefore, the display device 3 does not display the select button 251 of the output display screen 361. Accordingly, since the designer may not select any combination, it is possible to prevent the combination of the candidate components of the tube yoke and the shaft yoke which may influence a bending strength or cause a backlash.

As described above, when the fitting length JW satisfies the fitting length specification acquired in step S102 (Yes in step S112), the CPU 4c calculates an instruction for storing the combination of the candidate component of the tube yoke and the candidate component of the shaft yoke in the internal storage device 4f or the external storage device 5. For example, there is an instruction for storing the combination of the candidate components of the tube yoke and the shaft yoke illustrated in FIGS. 13-2, 13-3, 13-4, and 13-5 in the internal storage device 4f or the external storage device 5. For this reason, the display device 3 displays the select button 251 on the output display screens 362, 363, 364, and 365. Accordingly, since the designer selects the select button 251, it is possible to select the combination of the candidate components of the tube yoke and the shaft yoke which does not influence a bending strength and inhibits a backlash.

The control device 4 displays the select button 251 so that the control device 4 may store the combination of the candidate components of the tube yoke and the shaft yoke even when the positions of the tube yoke fitting leading end portion 11a and the shaft yoke fitting leading end portion 14a do not match each other as illustrated in, for example, FIG. 13-3, 13-4, or 13-5. That is, the control device 4 permits a state where a distance Rj between the tube yoke fitting leading end portion 11a and the shaft yoke fitting tail end portion 14b is longer than the fitting length JW.

Further, the control device 4 sets the substantial fitting length between the tube yoke fitting portion 11j and the shaft yoke fitting portion 14j as the fitting length JW, and compares the fitting length with the fitting length acquired in step S102. For this reason, the combination of the candidate components of the tube yoke and the shaft yoke increases by a degree in which the positions of the tube yoke fitting leading end portion 11a and the shaft yoke fitting leading end portion 14a do not match each other. As a result, the frequency of use of the existing component increases, and hence the number of the production components to be managed may be decreased.

Further, in the control device 4, the CPU 4c calculates the collision contraction length Rw in which the candidate component of the tube yoke and the candidate component of the shaft yoke are combined with each other. It is desirable that the CPU 4c executes a calculation of comparing the collision contraction length Rw with the information of the collision contraction length specification stored in the external storage device 5 or the internal storage device 4f. Accordingly, when the collision contraction length Rw is smaller than the information of the collision contraction length specification, that is, the collision contraction length Rw does not satisfy the collision contraction length specification, the control device 4 does not display the select button 251 so as not to store the combination of the candidate components of the tube yoke and the shaft yoke, for example, illustrated in FIGS. 13-6 and 13-7. Further, in the combination of the candidate components of the tube yoke and the shaft yoke illustrated in FIG. 13-6, the collision contraction length Rw does not satisfy the collision contraction length specification even in the case of the fitting length JW satisfying the fitting length specification acquired in step S102. In this case, the CPU 4c does not calculate an instruction for storing the combination of the candidate component of the tube yoke and the candidate component of the shaft yoke in the internal storage device 4f or the external storage device 5. Therefore, the display device 3 does not display the select button 251 as an index indicating the presence of the instruction, and advances the process to step S113. Accordingly, since the designer does not select the select button 251, it is possible to prevent the selection of the combination of the candidate components of the tube yoke and the shaft yoke which may cause the insufficient collision contraction length.

Next, when there is another component to be selected (Yes in step S113), the control device 4 returns the process to step S111, and displays the screen of the candidate component of the corresponding component. Where there is not another component to be selected (No in step S113), the process is advanced to step S107. The control device 4 displays a screen of a design instruction satisfying a design of a new component on the display device 3 (step S107).

Further, when the control device 4 receives an input by the selection of the designer select button 251 (Yes in step S115) in a state where the input of the designer is awaited (step S115), the control device 4 stores the combination of the candidate components in the internal storage device 4f or the external storage device 5 based on the instruction synchronized with the input signal from the display device 3. Next, the control device 4 advances the process to step S116.

Next, the control device 4 displays the drawing information of the combination of the candidate components of the tube yoke and the shaft yoke in the display device 3 in a three-dimensional space (step S114). The display device 3 disposes the candidate components of the tube yoke and the shaft yoke in a three-dimensional space in which the longitudinal direction, the vertical direction, and the transverse direction of the vehicle equipped with the steering device are defined as illustrated in FIG. 3. Accordingly, the designer may three-dimensionally recognize of the combination of the candidate components of the tube yoke and the shaft yoke. Further, the designer may rotate the intermediate shaft module 10 about the axis S on the display screen of the three-dimensional CAD, and finally check a proper state of the combination of the candidate components in consideration of the interference between the candidate components or the interference of the components disposed around the intermediate shaft module 10. By the above-described procedure, the control device 4 ends the process.

Figure 14:
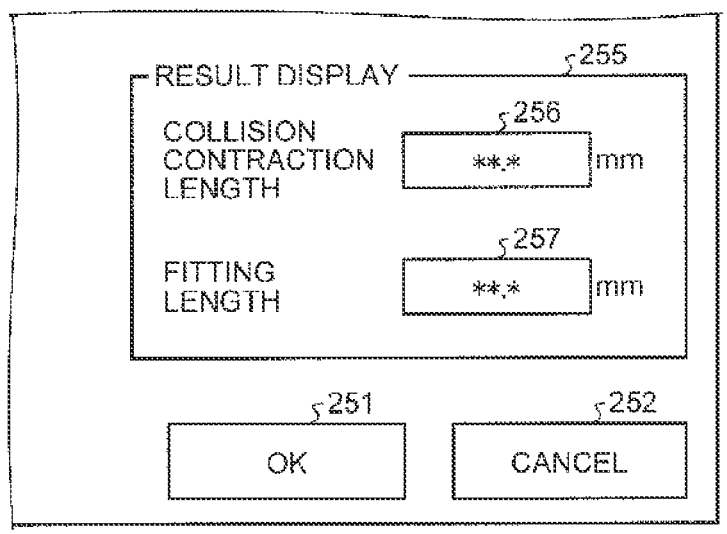
FIG. 14 is a diagram illustrating an example of the output display screen which displays a calculation result of a collision contraction length.

FIG. 14 is a diagram illustrating an example of the output display screen which displays a calculation result of the collision contraction length. The control device 4 may display the calculation result of the collision contraction length Rw and the fitting length JW as a result display 255 obtained by the combination of the candidate components of the tube yoke and the shaft yoke other than the select button 251 and the process stop button 252. For example, the control device 4 displays the calculation result of the collision contraction length Rw on a collision contraction length display section 256. Further, the control device 4 displays a calculation result of the fitting length JW on a fitting length display section 257. Accordingly, the designer may easily recognize the collision contraction length Rw and the fitting length JW in synchronization with the combination of the candidate components of the tube yoke and the shaft yoke.

In FIG. 14, when the fitting length JW satisfies the condition of the fitting length acquired in step S102, the control device 4 displays the calculation result of the fitting length JW on the fitting length display section 257, and for example, the cell of the fitting length display section 257 is highlighted in red. Further, when the collision contraction length Rw satisfies the condition of the collision contraction length, the control device 4 displays the calculation result of the collision contraction length Rw in the collision contraction length display section 256, and for example, the cell of the collision contraction length display section 256 is highlighted in red. Accordingly, the designer may understand whether the reason why the control device 4 does not display the select button 251 is caused by the fitting length JW which does not satisfy the fitting length specification, the collision contraction length Rw which does not satisfy the collision contraction length specification, or both reasons.

As described above, the design assistance device for the steering device may assist the selection of the combination of the candidate component of the tube yoke and the candidate component of the shaft yoke which uses the existing components of the tube yoke and the shaft yoke as much as possible.

When the fitting length JW in which the candidate component of the tube yoke and the candidate component of the shaft yoke are combined with each other satisfies the condition of the fitting length, the control device 4 displays the select button 251 on the display device 3. When the select button 251 is selected, the storage unit may store the combination of the candidate component of the tube yoke and the candidate component of the shaft yoke which is selected by the designer. Accordingly, the designer may select the combination of the candidate component of the tube yoke and the candidate component of the shaft yoke appropriate for the conditions of the joint length and the fitting length from the existing components in which the number of the tube yokes and the shaft yokes is large.

When the fitting length JW in which the candidate component of the tube yoke and the candidate component of the shaft yoke are combined with each other does not satisfy the condition of the fitting length, the control device 4 does not display the select button 251 on the display device 3. Since the select button 251 may not be selected, the control device 4 may not receive the information which determines the drawing selected by the designer. Accordingly, since the designer may not select any combination, it is possible to prevent the combination of the candidate components of the tube yoke and the shaft yoke which may influence a bending strength or cause a backlash.

When the fitting length JW in which the candidate component of the tube yoke and the candidate component of the shaft yoke are combined with each other satisfies the condition of the fitting length but the collision contraction length Rw is smaller than the information of the condition of the collision contraction length stored in the external storage device 5 or the internal storage device 4f, the control device 4 does not display the select button 251 on the display device 3. Since the select button 251 is not selected, the control device 4 may not receive the information which determines the drawing selected by the designer. Accordingly, it is possible to prevent the selection of the combination of the candidate components of the tube yoke and the shaft yoke which may cause the insufficient collision contraction length.

(Second Embodiment)

Figure 15:
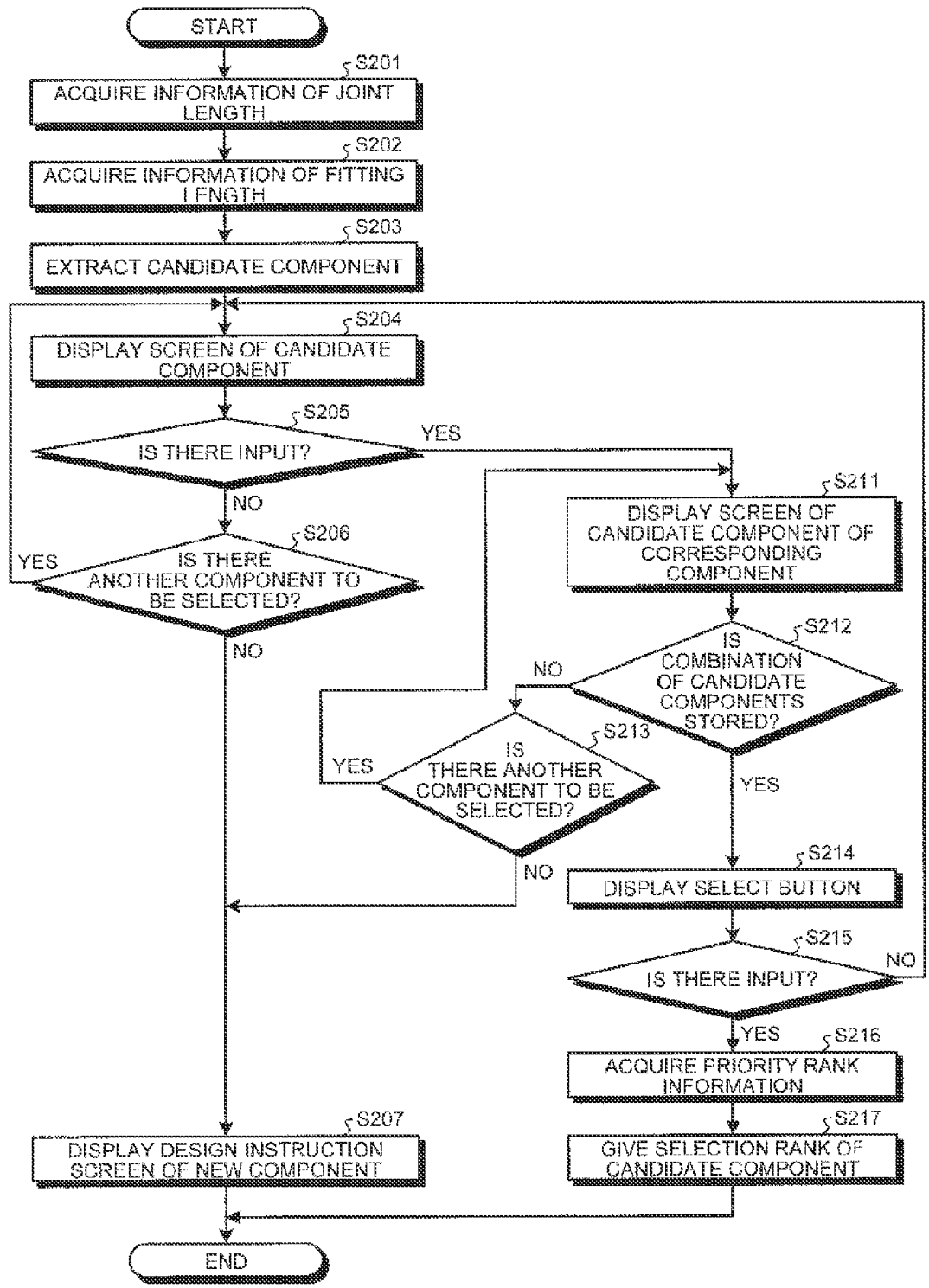
FIG. 15 is a flowchart illustrating a procedure of a process of a design assistance device for a steering device according to Second Embodiment.

FIG. 15 is a flowchart illustrating a procedure of a process of a design assistance device for a steering device according to Second Embodiment. In the embodiment, the control device 4 acquires priority rank information such as cost, and determines the prioritized combination of the candidate components of the tube yoke and the shaft yoke based on the priority rank information. Further, the same reference numerals will be given to the same components as those of the above-described embodiment, and the description thereof will not be repeated.

Further, since step S201, step S202, step S203, step S204, step S205, step S206, step S207, step S211, step S212, step S213, and step S214 respectively have the same process procedures as those of step S101, step S102, step S103, step S104, step S105, step S106, step S107, step S111, step S112, step S113, and step S114, the detailed description thereof will not be repeated.

As described above, the CPU 4c calculates an instruction for storing the combination of the candidate component of the tube yoke and the candidate component of the shaft yoke in the internal storage device 4f or the external storage device 5. The display device 3 displays the select button 251 which is an index indicating the presence of the instruction (step S214). Next, the control device advances the process to step S215, so that it becomes a state where the input of the designer is awaited.

When the designer does not select the select button 251 through the input device 2 such as a mouse or a keyboard (No in step S215), for example, when the process is stopped by the process stop button 252, the control device 4 returns the process to step S204, and the display device 3 displays the screen of the candidate component.

Further, when the control device 4 receives an input by the selection of the designer select button 251 (Yes in step S215) in a state where the input of the designer is awaited (step S215), the control device 4 stores the combination of the candidate components in the internal storage device 4f or the external storage device 5 based on the instruction synchronized with the input signal from the display device 3.

FIG. 16 is a diagram illustrating an example of a data table of the combination of the candidate components of the tube yoke and the shaft yoke. The control device 4 stores the combination of the candidate components as a circular mark (○) like, for example, a data table 411 illustrated in FIG. 16. Further, when the designer selects the process stop button 252 (No in step S215), the control device 4 does not store the selected component in the internal storage device 4f or the external storage device 5 (No in step S212). In this case, the control device 4 advances the process to step S204, and stores the case as a cross mark (×) in a data table 411. The control device 4 sequentially decreases the number of blanks of the data table 411 by performing the process procedure.

The control device 4 acquires priority rank information, for example, information of a priority rank to be selected first based on the cost of the candidate components of the tube yoke and the shaft yoke (step S216). FIG. 17-1 is a diagram illustrating an example of a cost data table of the candidate component of the tube yoke. FIG. 17-2 is a diagram illustrating an example of a cost data table the candidate component of the shaft yoke.

In a data table 421 illustrated in FIG. 17-1 and a data table 431 illustrated in FIG. 17-2, the circular mark (○) is a component of which a distribution amount is large and cost decreases among the existing components. In the data table 421 and the data table 431, a triangular mark (Δ) is a component of which a distribution amount is present and cost is medium among the existing components. In the data table 421 and the data table 431, a cross mark (×) is a component of which a distribution amount is small and cost is expensive among the existing components. The control device 4 stores the data table 421 and the data table 431 as the priority rank information in the internal storage device 4f or the external storage device 5 in advance. In step S216, the control device 4 performs a process of reading out the data table 421 and the data table 431 from the internal storage device 4f or the external storage device 5 to the RAM 4e, and advances the process to step S217.

The CPU 4c of the control device 4 gives a selection rank of the candidate component to the combination of the candidate components stored in step S214 based on the priority rank information acquired in step S216 (step S217). For example, the control device 4 applies the priority ranks of the data table 421 and the data table 431 to the data table 411. FIG. 18 is a diagram illustrating an example of a rank data table which shows a priority rank of a combination of the candidate components of the tube yoke and the shaft yoke.

For example, in FIG. 18, the control device 4 sets the combination of the circular mark (○) of the data table 421 and the circular mark (○) of the data table 431 as a rank "1". The control device 4 sets the combination including the circular mark (○) of the data table 421 (○) or the circular mark (○) of the data table 431 and including the triangular mark (Δ) of the data table 421 or the triangular mark (Δ) of the data table 431 as a rank "2".

Further, the control device 4 sets the combination including the triangular mark (Δ) of the data table 421 and the triangular mark (Δ) of the data table 431 as a rank "3". The control device 4 sets the combination including the circular mark (○) of the data table 421 or the circular mark (○) of the data table 431 and the cross mark (×) of the data table 421 or the cross mark (×) of the data table 431 as a rank "4".

Further, the control device 4 sets the combination of the cross mark (×) of the data table 421 and the cross mark (×) of the data table 431 as a rank "5". Further, in the data table 441, the crossbar (−) is the combination in which the combination of the candidate components of the tube yoke and the shaft yoke is not established in the data table 411.

The control device 4 determines the combination of the prioritized components from the combinations of the candidate components of the tube yoke and the shaft yoke of which the number is the smallest in the data table 441. For example, the control device 4 determines the combination of the components in which the combination of the candidate component of the drawing number TY4 of the tube yoke and the candidate component of the drawing number SY4 of the shaft yoke in FIG. 18 is prioritized. By the above-described procedure, the control device 4 ends the process.

As described above, when there are plural combinations of the candidate component of the tube yoke and the candidate component of the shaft yoke, the design assistance device for the steering device may assist the selection of the combination in which a condition such as cost is better among the candidate components. Alternatively, when there are plural combinations of the candidate component of the tube yoke and the candidate component of the shaft yoke, the design assistance device for the steering device may assist the selection of the combination in which a condition such as a weight or a layout is better among the candidate components.

(Third Embodiment)

Figure 19:
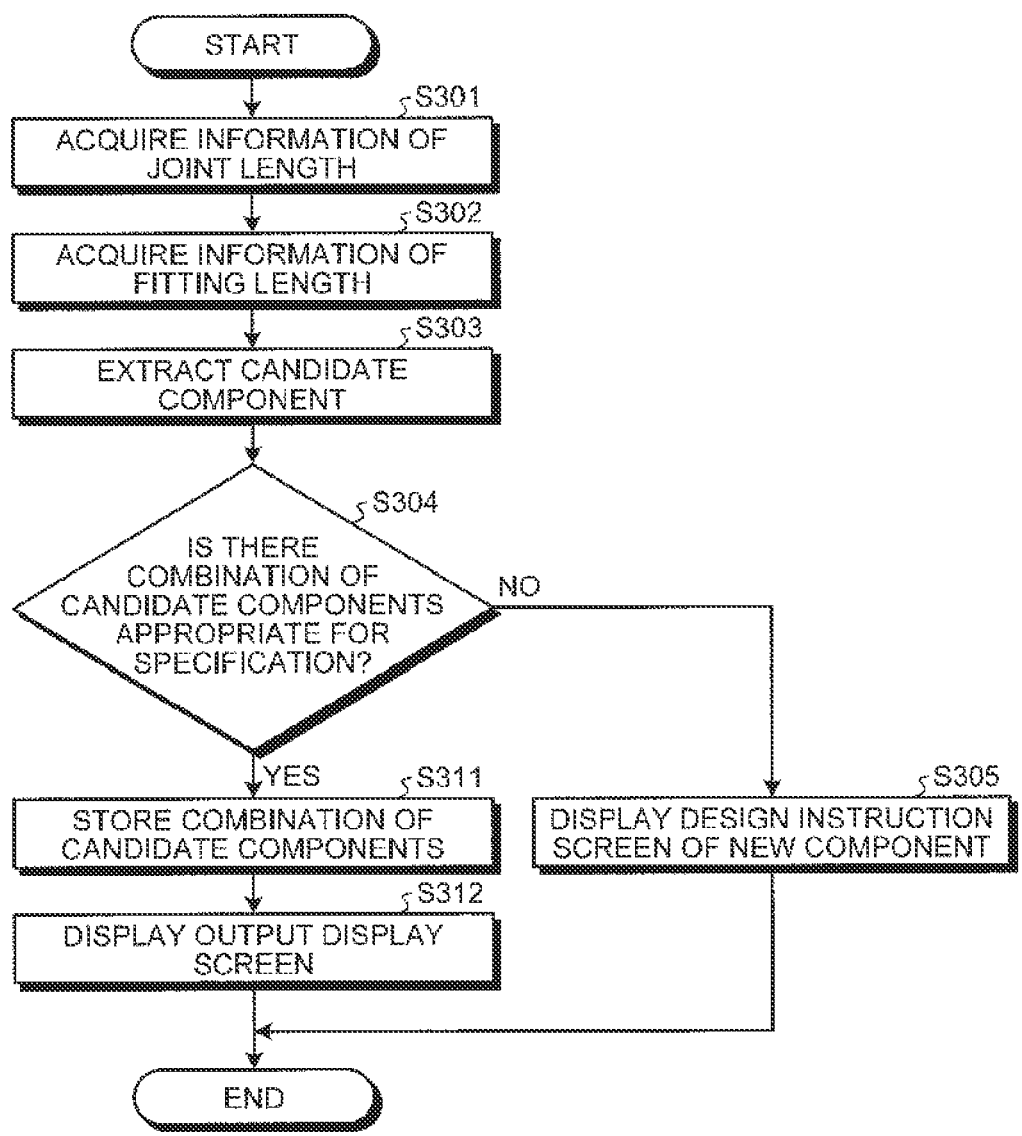
FIG. 19 is a flowchart illustrating a procedure of a process of a design assistance device for a steering device according to Third Embodiment.

FIG. 19 is a flowchart illustrating a procedure of a process of a design assistance device for a steering device according to Third Embodiment. In the embodiment, where there is a combination of the candidate components appropriate to the specification, the control device 4 stores the combination of the candidate components of the tube yoke and the shaft yoke, and displays the output display screen of the candidate components. Further, the same reference numerals will be given to the same components as those of the above-described embodiment, and the description thereof will not be repeated.

Further, since step S301, step S302, and step S303 respectively have the same process procedures as those of step S101, step S102, and step S103 of First Embodiment, the detailed description thereof will not be repeated.

Next, the control device 4 calculates the combination of the candidate components appropriate for the specification in which the candidate component extracted in step S303 satisfies the joint length acquired in step S301, the fitting length specification acquired in step S302, and the collision contraction length specification stored in the external storage device 5 or the internal storage device 4f. When there is no combination of the candidate components appropriate for the specification (No in step S304), the process is advanced to step S305. The control device 4 displays a screen of a design instruction for prompting a design of a new component on the display device 3 (step S305). When there is a combination of the candidate components appropriate for the specification (Yes in step S304), the process is advanced to step S311.

Next, the control device 4 stores all combinations of the candidate components appropriate for the specification as the circular mark (○) like the data table 411 illustrated in FIG. 16 (step S311). Therefore, the control device 4 advances the process to step S312.

Next, the control device 4 displays the output display screen of the combination of the appropriate candidate components of the circular mark (○) of the data table 411 stored in step S311 and illustrated in FIG. 16, for example, the output display screen 362 to the output display screen 365 illustrated in FIGS. 13-2 to FIG. 13-5 on the display device 3. Accordingly, the designer may efficiently check the output display screen 362 to the output display screen 365 which are appropriate for the specification.

(Fourth Embodimen)

Figure 20:
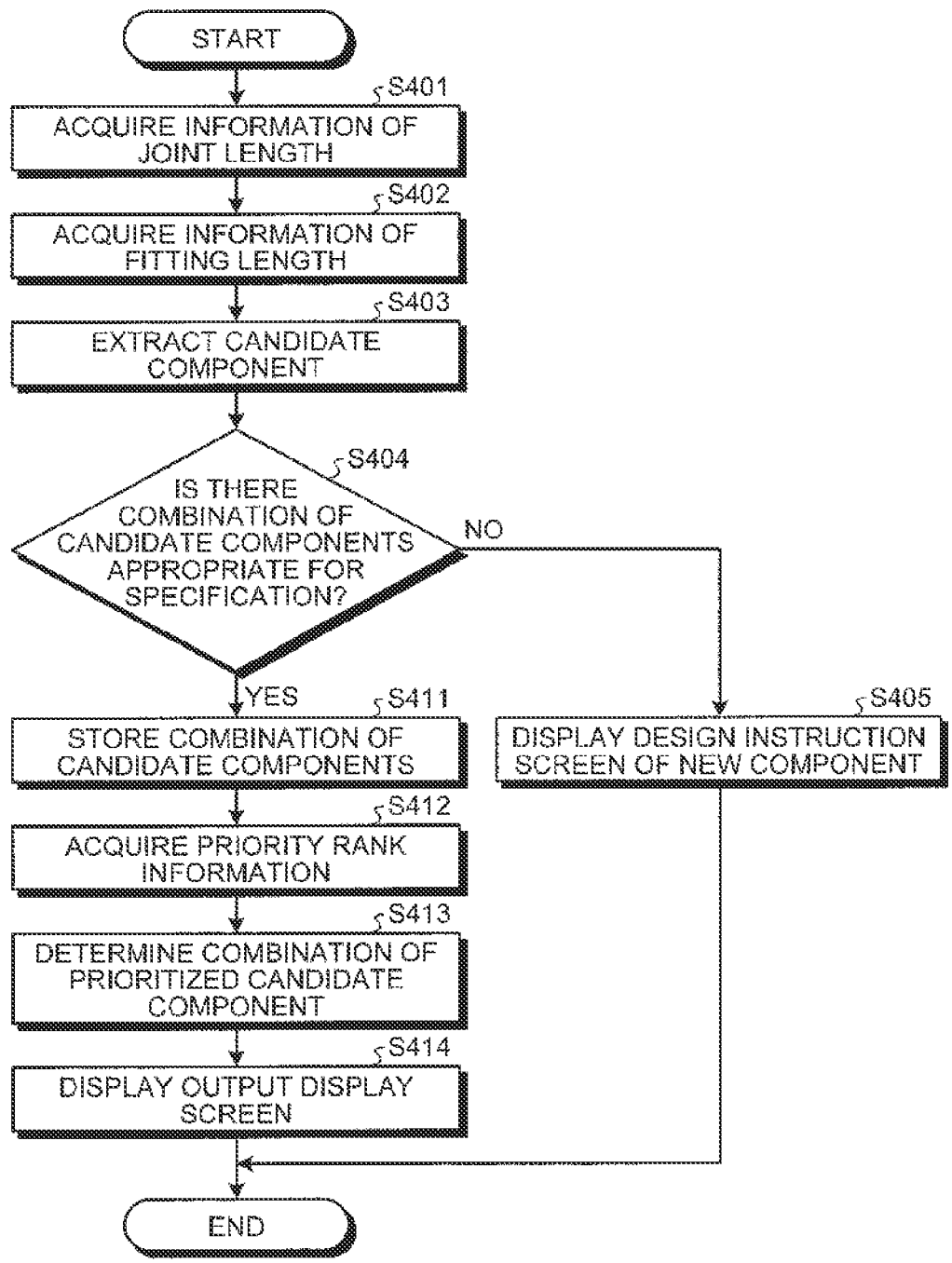
FIG. 20 is a flowchart illustrating a procedure of a process of a design assistance device for a steering device according to Fourth Embodiment.

FIG. 20 is a flowchart illustrating a procedure of a process of a design assistance device for a steering device according to Fourth Embodiment. In the embodiment, when there is a combination of the candidate components appropriate for the specification, the control device 4 stores the combination of the candidate components of the tube yoke and the shaft yoke, and displays the output display screen of the prioritized candidate component and the appropriate candidate component. Further, the same reference numerals will be given to the same components as those of the above-described embodiment, and the description thereof will not be repeated.

Since step S401, step S402, and step S403 respectively have the same process procedures as those of step S101, step S102, and step S103 of First Embodiment, the detailed description thereof will not be repeated. Further, since step S404, step S405, and step S411 respectively have the same process procedures as those of step S304, step S1305, and step S311 of Third Embodiment, the detailed description thereof will not be repeated.

Next, the CPU 4c of the control device 4 acquires priority rank information, for example, information of a priority rank to be selected first based on the cost of the candidate components of the tube yoke and the shaft yoke (step S412). This procedure is the same as that of the process of step S216 described in Second Embodiment.

Next, the control device 4 sequences the combinations of the candidate components stored in step S411 based on the priority rank information acquired in step S412, and determines the combination of the prioritized components (step S413). This procedure is the same as that of the process procedure of step S214 described in Second Embodiment. The control device 4 determines the combination of the prioritized candidate components from the combinations of the candidate components of the tube yoke and the shaft yoke of which the number is the smallest in the data table 441.

Next, the control device 4 displays the output display screen of the combination of the prioritized candidate component determined in step S413, for example, an output display screen 364 illustrated in FIG. 13-4 on the display device 3 (step S414). Accordingly, the designer may efficiently check the output display screen 364 which displays the combination of the candidate components appropriate for the specification and having a high priority.

REFERENCE SIGNS LIST

1: design assistance device for steering device
2: input device
3: display device
4: control device
4a: input interface
4b: output interface
4c: CPU
4d: ROM
4e: RAM
4f: internal storage device
5: external storage device
10: intermediate shaft module
11: tube yoke
12, 12: arm portion
14: shaft yoke
15, 15: arm portion
21: column yoke
31: pinion side yoke
41, 51: cross joint
60: pinion shaft
61b: rack
70: tie-rod
103: steering mechanism
105: ignition switch
107: vehicle speed sensor
110: handle
120a: input shaft
120b: column output shaft
130: torque sensor
140: assist steering mechanism
150: speed reducing gear box
160: electric motor
H: handle position reference point
HJ: connection reference point
GJ: connection reference point
GC: steering gear reference point

The invention claimed is:

1. A design assistance device for a steering device, the design assistance device assisting a design of an intermediate shaft module including a tube yoke and a shaft yoke connected to the tube yoke, the design assistance device for the steering device comprising:
- a storage unit which stores at least
  - joint length information having a joint length as a distance between a first connection reference point where the intermediate shaft module is connected to a column yoke and a second connection reference point where the intermediate shaft module is connected to a pinion side yoke and
  - a fitting length specification as a condition of a fitting length where the tube yoke and the shaft yoke are connected to each other,
  - tube yoke information of the tube yokes, and
  - shaft yoke information of the shaft yokes;
- a candidate component extraction unit which extracts a candidate tube yoke having a length less than the joint length and extracts a candidate shaft yoke having a length less than the joint length, based on the joint length information, the shaft yoke information, and the tube yoke information;
- a calculation unit which calculates, according to a calculation instruction, the fitting length of a candidate combination of the candidate tube yoke and the candidate shaft yoke that are disposed between the first connection reference point and the second connection reference point; and
- a display unit,
- wherein, when the fitting length of the candidate combination including the candidate tube yoke and the candidate shaft yoke that fits inside of the candidate tube yoke satisfies the fitting length specification, the candidate combination is stored in the storage unit, and the display unit displays an index,
- the candidate tube yoke includes:
  - a tube yoke fitting leading end that is a leading point of a tube yoke fitting portion; and
  - a tube yoke fitting tail end that is a tail point of the tube yoke fitting portion at an inner peripheral side of a cylinder of the tube yoke, the candidate shaft yoke includes:
  - a shaft yoke fitting leading end that is a leading point of a shaft yoke fitting portion; and
  - a shaft yoke fitting tail end that is a tail point of the shaft yoke fitting portion, and
  - the display unit displays the index when the fining length of the candidate combination satisfies the fitting length specification whether positions of the tube yoke fitting leading end and the shaft yoke fitting leading end match each other or not.

2. The design assistance device for the steering device according to claim 1,
   wherein the storage unit stores a collision-contraction length specification as a condition of a collision-contraction length that is a distance in which the fitting between the tube yoke and the shaft yoke is released and the shaft yoke is movable inside the tube yoke, and
   wherein the display unit displays an index when the collision-contraction length of the candidate combination of the candidate tube yoke and the candidate shaft yoke satisfies the collision-contraction length specification.

3. The design assistance device for the steering device according to claim 2,
   wherein the calculation unit gives a selection rank to each of the candidate combinations in accordance with priority rank information stored in the storage unit.

4. The design assistance device for the steering device according to claim 1,
   wherein the display unit displays a drawing of the candidate tube yoke or the candidate shaft yoke between the first connection reference point and the second connection reference point based on selection information of an input unit that selects the candidate tube yoke or the candidate shaft yoke extracted by the candidate component extraction unit.

5. The design assistance device for the steering device according to claim 4,
   wherein the display unit displays information of the candidate combination, which includes the candidate tube yoke and the candidate shaft yoke stored in the storage unit in a three-dimensional space in which the longitudinal direction, the vertical direction, and the transverse direction of a vehicle equipped with the steering device are defined.

6. The design assistance device for the steering device according to claim 4,
   wherein the calculation unit gives a selection rank to each of the candidate combinations in accordance with priority rank information stored in the storage unit.

7. The design assistance device for the steering device according to claim 1,
   wherein the display unit displays information of the candidate combination, which includes the candidate tube yoke and the candidate shaft yoke stored in the storage unit, in a three-dimensional space in which the longitudinal direction, the vertical direction, and the transverse direction of a vehicle equipped with the steering device are defined.

8. The design assistance device for the steering device according to claim 7,
   wherein the calculation unit gives a selection rank to each of the candidate combinations in accordance with priority rank information stored in the storage unit.

9. The design assistance device for the steering device according to claim 1,
   wherein the calculation unit gives a selection rank to each of the candidate combinations in accordance with priority rank information stored in the storage unit.

10. A design assistance device for a steering device, the design assistance device assisting a design of an intermediate shaft module including a tube yoke and a shaft yoke connected to the tube yoke, the design assistance device for the steering device comprising;
    - a storage unit which stores at least
      - joint length information having a joint length as a distance between a first connection reference point where the intermediate shaft module is connected to a column yoke and a second connection reference point where the intermediate shaft module is connected to a pinion side yoke and
      - a fitting length specification as a condition of a fitting length where the tube yoke and the shaft yoke are connected to each other,
      - tube yoke information of the tube yokes, and
      - shaft yoke information of the shaft yokes;
    - a candidate component extraction unit which extracts a candidate tube yoke having a length less than the joint length and extracts a candidate shaft yoke having a length less than the joint length, based on the joint length information, the shaft yoke information, and the tube yoke information;
    - a calculation unit which calculates, according to a calculation instruction, the fitting length of a candidate combination of the candidate tube yoke and the candidate shaft yoke that are disposed between the first connection reference point and the second connection reference point; and a display unit, wherein, when the fitting length of the candidate combination including the candidate tube yoke and the candidate shaft yoke that fits inside of the candidate tube yoke satisfies the fitting length specification, the candidate combination is stored in the storage unit, and the display unit displays an index, the storage unit stores a collision-contraction length specification as a condition of a collision-contraction length that is a distance in which the fitting between the tube yoke and the shaft yoke is released and the shaft yoke is movable inside the tube yoke, the candidate tube yoke includes:
- a tube yoke fitting leading end that is a leading point of a tube yoke fitting portion; and
- a tube yoke fitting tail end that is a tail point of the tube yoke fitting portion at an inner peripheral side of a cylinder of the tube yoke, the candidate component of the shaft yoke includes:
- a shaft yoke fitting leading end that is a leading point of a shaft yoke fitting portion; and
- a shaft yoke fitting tail end that is a tail point of the shaft yoke fitting portion, and the display unit displays the index when the fitting length satisfies the fitting length specification whether positions of the tube yoke fitting leading end and the shaft yoke fitting leading end match each other or not.

11. A method of assisting a steering device design, which causes a computer to assist a design of an intermediate shaft module including a tube yoke and a shaft yoke connected to the tube yoke, the method of assisting the steering device design comprising:

acquiring joint length information having a joint length as a distance between a first connection reference point where the intermediate shaft module is connected to a column yoke and a second connection reference point where the intermediate shaft module is connected to a pinion side yoke;

acquiring a fitting length specification as a condition of a fitting length where the tube yoke and the shaft yoke are connected to each other;

acquiring tube yoke information of the tube yoke and shaft yoke information of the shaft yoke;

extracting a candidate tube yoke having a length less than the joint length and a candidate shaft yoke having a length less than the joint length, based on the joint length information, the shaft yoke information, and the tube yoke information; and calculating, according to a calculation instruction, the fitting length of a candidate combination of the candidate tube yoke and the candidate shaft yoke that are disposed between the first connection reference point and the second connection reference point, wherein, when the fitting length of the candidate combination including the candidate tube yoke and the candidate shaft yoke that fits inside of the candidate tube yoke satisfies the fitting length specification, the candidate combination is stored in a storage unit, and a display unit displays an index, the candidate tube yoke includes:
- a tube yoke fitting leading end that is a leading point of a tube yoke fitting portion, and
- a tube yoke fitting tail end that is a tail point of the tube yoke fitting portion at an inner peripheral side of a cylinder of the tube yoke, the candidate shaft yoke includes:
- a shaft yoke fitting leading end that is a leading point of a shaft yoke fitting portion; and
- a shaft yoke fitting tail end that is a tail point of the shaft yoke fitting portion, and the display unit displays the index when the fitting length of the candidate combination satisfies the fitting length specification whether positions of the tube yoke fitting leading end and the shaft yoke fitting leading end match each other or not.

12. The method of assisting the steering device design according to claim 11, further comprising storing a collision-contraction length specification as a condition of a collision-contraction length that is a distance in which the fitting between the tube yoke and the shaft yoke is released and the shaft yoke is movable inside the tube yoke, wherein the display unit displays an index when the collision-contraction length of the candidate combination of the candidate tube yoke and the candidate shaft yoke satisfies the collision-contraction length specification.

13. The method of assisting the steering device design according to claim 12, further comprising:
determining a prioritized candidate combination with respect to the candidate combinations including the candidate tube yoke and the candidate shaft yoke stored in the storage unit.

14. The method of assisting the steering device design according to claim 12, further comprising:
displaying information of the candidate combination, which includes the candidate tube yoke and the candidate shaft yoke stored in the storage unit, in a three-dimensional space in which the longitudinal direction, the vertical direction, and the transverse direction of a vehicle equipped with the steering device are defined.

15. The method of assisting the steering device design according to claim 11, further comprising:
determining a prioritized candidate combination with respect to the candidate combinations including the candidate tube yoke and the candidate shaft yoke stored in the storage unit.

16. The method of assisting the steering device design according to claim 15, further comprising:
displaying information of the candidate combination, which includes the candidate tube yoke and the candidate shaft yoke stored in the storage unit, in a three-dimensional space in which the longitudinal direction, the vertical direction, and the transverse direction of a vehicle equipped with the steering device are defined.

17. The method of assisting the steering device design according to claim 11, further comprising:
displaying information of the candidate combination, which includes the candidate tube yoke and the candidate shaft yoke stored in the storage unit in a three-dimensional space in which the longitudinal direction, the vertical direction, and the transverse direction of a vehicle equipped with the steering device are defined.

18. A method of assisting a steering device design, which causes a computer to assist a design of an intermediate shaft module including a tube yoke and a shaft yoke connected to the tube yoke, the method of assisting the steering device design comprising:

acquiring joint length information having a joint length as a distance between a first connection reference point where the intermediate shaft module is connected to a column yoke and a second connection reference point where the intermediate shaft module is connected to a pinion side yoke;

acquiring a fitting length specification as a condition of a fitting length where the tube yoke and the shaft yoke are connected to each other;

acquiring tube yoke information of the tube yoke and shaft yoke information of the shaft yoke;

extracting a candidate tube yoke having a length less than the joint length and a candidate shaft yoke having a length less than the joint length, based on the joint length information, the shaft yoke information, and the tube yoke information; and calculating, according to a calculation instruction, the fitting length of a candidate combination of the candidate tube yoke and the candidate shaft yoke that are disposed between the first connection reference point and the second connection reference point, wherein, when the fitting length of the candidate combination including the candidate tube yoke and the candidate shaft yoke that fits inside of the candidate tube yoke satisfies the fitting length specification, the candidate combination is stored in a storage unit, and a display unit displays an index, the storage unit stores a collision-contraction length specification as a condition of a collision-contraction length that is a distance in which the fitting between the tube yoke and the shaft yoke is released and the shaft yoke is movable inside the tube yoke, the candidate tube yoke includes:
  a tube yoke fitting leading end that is a leading point of a tube yoke fitting portion; and
  a tube yoke fitting tail end that is a tail point of the tube yoke fitting portion at an inner peripheral side of a cylinder of the tube yoke, the candidate component of the shaft yoke includes:
  a shaft yoke fitting leading end that is a leading point of a shaft yoke fitting portion; and
  a shaft yoke fitting tail end that is a tail point of the shaft yoke fitting portion, and the display unit displays the index when the fitting length satisfies the fitting length specification whether positions of the tube yoke fitting leading end and the shaft yoke fitting leading end match each other or not.

* * * * *

UNITED STATES PATENT AND TRADEMARK OFFICE
CERTIFICATE OF CORRECTION

PATENT NO. : 9,519,748 B2
APPLICATION NO. : 13/812084
DATED : December 13, 2016
INVENTOR(S) : Masaki Tomaru et al.

Page 1 of 1

It is certified that error appears in the above-identified patent and that said Letters Patent is hereby corrected as shown below:

On the Title Page

Column 1, item (54), before "ASSISTANCE", insert --DESIGN--.

Signed and Sealed this
Twenty-fifth Day of April, 2017

Michelle K. Lee
*Director of the United States Patent and Trademark Office*